United States Patent
Isobe et al.

(10) Patent No.: US 10,513,028 B2
(45) Date of Patent: Dec. 24, 2019

(54) COMPOSITE WORK DEVICE USING LINK OPERATING DEVICE

(71) Applicant: NTN CORPORATION, Osaka (JP)

(72) Inventors: Hiroshi Isobe, Iwata (JP); Seigo Sakata, Iwata (JP); Naoki Marui, Iwata (JP); Kenzou Nose, Iwata (JP)

(73) Assignee: NTN CORPORATION, Osaka (JP)

( * ) Notice: Subject to any disclaimer, the term of this patent is extended or adjusted under 35 U.S.C. 154(b) by 107 days.

(21) Appl. No.: 15/914,446

(22) Filed: Mar. 7, 2018

(65) Prior Publication Data
US 2018/0194002 A1    Jul. 12, 2018

Related U.S. Application Data

(63) Continuation of application No. PCT/JP2016/075729, filed on Sep. 1, 2016.

(30) Foreign Application Priority Data

Sep. 7, 2015 (JP) ................... 2015-175504

(51) Int. Cl.
*B25J 9/04* (2006.01)
*B25J 9/06* (2006.01)
*B25J 9/00* (2006.01)

(52) U.S. Cl.
CPC ............. *B25J 9/046* (2013.01); *B25J 9/0018* (2013.01); *B25J 9/0087* (2013.01); *B25J 9/06* (2013.01); *Y10S 901/15* (2013.01); *Y10S 901/28* (2013.01)

(58) Field of Classification Search
CPC .............................. B25J 9/0087; B25J 9/0018
See application file for complete search history.

(56) References Cited

U.S. PATENT DOCUMENTS 5,893,296 A * 4/1999 Rosheim .............. G05G 5/03
  74/490.03
6,719,506 B2 * 4/2004 Chang ................ B23Q 1/012
  409/134

(Continued)

FOREIGN PATENT DOCUMENTS

EP    0 987 087 A2   3/2000
JP    2000-94245      4/2000

(Continued)

OTHER PUBLICATIONS

English Translation by WIPO of the International Preliminary Report on Patentability dated Mar. 22, 2018, in corresponding International Patent Application No. PCT/JP2016/075729, 6 pgs.

(Continued)

*Primary Examiner* — William Kelleher
*Assistant Examiner* — Gregory T Prather

(57) ABSTRACT

The composite work apparatus includes: two link actuation devices that support two working bodies such that postures of the working bodies can be individually changed; and three or more linear motion actuators that move the two link actuation devices and two or more work objects relative to each other. In each link actuation device, a distal end side link hub is connected to a proximal end side link hub via three or more link mechanisms such that a posture of the distal end side link hub can be changed relative to the proximal end side link hub, and a posture control actuator that arbitrarily changes the posture of the distal end side link hub relative to the proximal end side link hub is provided to each of two or more link mechanisms of the three or more link mechanisms.

6 Claims, 17 Drawing Sheets

(56) References Cited

U.S. PATENT DOCUMENTS

| | | | | |
|---|---|---|---|---|
| 6,921,011 | B1* | 7/2005 | Mangelsen | B23K 37/047 |
| | | | | 228/44.3 |
| 9,522,469 | B2 | 12/2016 | Isobe et al. | |
| 10,391,641 | B2* | 8/2019 | Konagai | B25J 5/04 |
| 2006/0157533 | A1* | 7/2006 | Onoue | B23K 9/095 |
| | | | | 228/8 |
| 2009/0143907 | A1* | 6/2009 | Demathelin | B25J 17/0266 |
| | | | | 700/245 |
| 2011/0054682 | A1* | 3/2011 | Miyauchi | B25J 9/0084 |
| | | | | 700/245 |
| 2013/0017050 | A1* | 1/2013 | Fukudome | B25J 17/0266 |
| | | | | 414/729 |
| 2014/0230594 | A1* | 8/2014 | De Bie | B25J 18/00 |
| | | | | 74/490.01 |
| 2015/0088308 | A1* | 3/2015 | Isobe | B25J 9/0048 |
| | | | | 700/245 |
| 2015/0217318 | A1* | 8/2015 | Letard | B25J 9/0018 |
| | | | | 118/323 |
| 2015/0217359 | A1* | 8/2015 | Segura Golorons | B21D 43/22 |
| | | | | 414/790.9 |
| 2015/0314890 | A1* | 11/2015 | DesJardien | B66C 5/02 |
| | | | | 212/324 |
| 2016/0067840 | A1* | 3/2016 | Fujimoto | B23Q 3/1554 |
| | | | | 483/58 |
| 2016/0263641 | A1* | 9/2016 | Savoy | B62D 65/024 |
| 2016/0332295 | A1* | 11/2016 | Brogårdh et al. | B25J 9/0051 |
| 2017/0259434 | A1* | 9/2017 | Takeda | B25J 9/0018 |
| 2018/0194016 | A1* | 7/2018 | Nakanishi | B25J 5/02 |
| 2018/0207810 | A1* | 7/2018 | Konagai | F16H 21/46 |
| 2018/0243897 | A1* | 8/2018 | Hashimoto | B23P 19/04 |
| 2018/0297213 | A1* | 10/2018 | Haruna | B25J 5/04 |
| 2019/0047159 | A1* | 2/2019 | Isobe | B25J 9/0087 |
| 2019/0105745 | A1* | 4/2019 | Takeda | B25J 9/0018 |
| 2019/0111649 | A1* | 4/2019 | Johnson | B31B 50/006 |
| 2019/0160673 | A1* | 5/2019 | Hirata | B25J 9/0087 |

FOREIGN PATENT DOCUMENTS

| | | |
|---|---|---|
| JP | 2005-226777 | 8/2005 |
| JP | 2012-66323 | 4/2012 |
| JP | 2014-5926 | 1/2014 |
| JP | 2015-523224 | 8/2015 |

OTHER PUBLICATIONS

Decision of Grant dated Dec. 6, 2016 in corresponding Japanese Patent Application No. 2015-175504.

International Search Report dated Oct. 4, 2016 in corresponding International Patent Application No. PCT/JP2016/075729.

* cited by examiner

COMPOSITE WORK DEVICE USING LINK OPERATING DEVICE

CROSS REFERENCE TO THE RELATED APPLICATION

This application is a continuation application, under 35 U.S.C. § 111(a) of international patent application No. PCT/JP2016/075729, filed Sep. 1, 2016, which claims priority to Japanese patent application No. 2015-175504, filed Sep. 7, 2015, the entire disclosure of which is herein incorporated by reference as a part of this application.

BACKGROUND OF THE INVENTION

Field of the Invention

The present invention relates to a composite work apparatus using link actuation devices to be used in equipment, such as medical equipment and industrial equipment, that requires a high-speed, high-accuracy and wide operating range.

Description of Related Art

Parallel link mechanisms and link actuation devices to be used in various types of work apparatuses such as medical equipment and industrial equipment are suggested in Patent Documents 1, 2 and 3.

The parallel link mechanism of Patent Document 1 has a comparatively simple configuration, but the operating angle of each link thereof is small. Accordingly, there is a problem in that if the operating range of a travelling plate is set to be large, the link length is increased, thus resulting in large dimensions of the entire mechanism, which leads to an increase in the size of the apparatus. There is also a problem in that the rigidity of the entire mechanism is low, and thus the weight of a tool to be mounted on the travelling plate, that is, the weight capacity of the travelling plate is limited to a small value.

The link actuation device of Patent Document 2 or Patent Document 3 uses a parallel link mechanism in which a distal end side link hub is coupled to a proximal end side link hub via three or more quadric chain link mechanisms such that the posture of the distal end side link hub relative to the proximal end side link hub can be changed. Accordingly, the link actuation device is compact in size, but can operate at high speed and with high accuracy in a wide operating range.

RELATED DOCUMENT

Patent Document

[Patent Document 1] JP Laid-open Patent Publication No. 2000-094245
[Patent Document 2] U.S. Pat. No. 5,893,296.
[Patent Document 3] JP Laid-open Patent Publication No. 2014-005926

In order to broaden the utilization area of the link actuation devices of Patent Documents 2 and 3 which have the above advantage, using two link actuation devices in combination with another mechanism has been examined. For example, in a situation in which components flow as a set at the right and left sides on a conveyor line in an automobile component manufacturing line or the like, performing work such as grease application, inspection and assembling on the flowing components is assumed.

FIG. 16 and FIG. 17 show an examination example of a composite work apparatus using two link actuation devices. The composite work apparatus 1 of the examination example performs work on two work objects 2, 2 placed on a floor 4, by using two working bodies 3, 3 that are respectively supported by two link work devices 7L and 7R such that the postures of the working bodies 3, 3 can be changed. The respective link work devices 7L and 7R are individually movable in front, rear, left, and right directions by: linear motion actuators 80L and 80R that move the respective link work devices 7L and 7R in the right-left direction (an X-axis direction) in FIG. 16 and FIG. 17; and linear motion actuators 81L and 81R that move the respective link work devices 7L and 7R in the front-rear direction (a Y-axis direction) in FIG. 16 and FIG. 17. The linear motion actuators 80L and 80R for left and right movement are coaxially disposed, for example. FIG. 16 shows a case of performing work on the two work objects 2, 2 from the left and right exterior, and FIG. 17 shows a case of performing work on the two work objects 2, 2 from the left and right interior.

With the configuration in FIG. 16 and FIG. 17, the ranges of movement of the two link work devices 7L and 7R in the right-left direction are limited. In the case where the linear motion actuators 80L and 80R for left and right movement are coaxially disposed as in this example, the ranges of movement of the two link work devices 7L and 7R are limited by effective strokes SL and SR of the respective linear motion actuators 80L and 80R, and the link work devices 7L and 7R cannot move beyond the center, in the right-left direction, of the composite work apparatus 1. Thus, when work is performed on the work objects 2, 2 from the left and right interior as shown in FIG. 17, it is necessary to place the work objects 2, 2 with a large inter-work object distance d provided therebetween in order to prevent the two link work devices 7L and 7R from interfering with each other, and thus the size of the entire composite work apparatus 1 is increased in the right-left direction.

If the linear motion actuators 80L and 80R for left and right movement are disposed so as to be displaced from each other in the front-rear direction, the right end of the left linear motion actuator 80L is extended rightward, and the left end of the right actuator 80R is extended leftward, the ranges of movement of the two link work devices 7L and 7R in the right-left direction can be wide. However, with such a configuration, there is a possibility that the two link work devices 7L and 7R interfere with each other, unless operation of the respective linear motion actuators 80L, 80R, 81L and 81R and the respective link work devices 7L and 7R is accurately managed, and therefore, it is difficult to adopt such a configuration in reality.

SUMMARY OF THE INVENTION

An object of the present invention is to provide a composite work apparatus that can simultaneously perform work on two work objects by using two link actuation devices capable of operating at high speed and with high accuracy and that is compact in overall size due to the distance between the two work objects being short.

A composite work apparatus using a link actuation device according to the present invention performs work on two or more work objects with two working bodies in a contact state or in a non-contact state, and includes: two link actuation devices supporting the relative two working bodies such that postures of the working bodies can be individually changed; and three or more linear motion actuators configured to move the two link actuation devices relative to the two or more work objects.

Each of the link actuation devices includes a proximal end side link hub; a distal end side link hub; and three or more link mechanisms which connect the proximal end side link hub to the distal end side link hub such that a posture of the distal end side link hub can be changed relative to the proximal end side link hub. Each of the link mechanisms includes: a proximal side end link member coupled at one end thereof to the proximal end side link hub; a distal side end link member coupled at one end thereof to the distal end side link hub; and an intermediate link member rotatably coupled at both ends thereof to the other ends of the proximal side and distal side end link members, respectively. A posture control actuator, which arbitrarily changes the posture of the distal end side link hub relative to the proximal end side link hub, is provided at each of two or more link mechanisms of the three or more link mechanisms.

A first linear motion actuator, that is one of the three or more linear motion actuators, directly or indirectly moves the two link actuation devices or the two or more work objects along a determined line with an interval therebetween kept constant. A second linear motion actuator and a third linear motion actuator, that are two linear motion actuators, other than the first linear motion actuator, of the three or more linear motion actuators, directly or indirectly move the two link actuation devices or the two or more work objects in a direction perpendicular to a movement direction of the first linear motion actuator.

According to this configuration, the two link actuation devices or two or more work objects are moved along a determined straight line by the first linear motion actuator, and the two link actuation devices or the two or more work objects are moved by the second linear motion actuator and the third linear motion actuator in the direction perpendicular to the movement direction of the first linear motion actuator. Thereby, the two link actuation devices are moved relative to the two or more work objects. In addition, the postures of the working bodies are changed by the link actuation devices in synchronization with the relative movement of the link actuation devices to the work objects. Accordingly, work can be simultaneously performed on the two or more work objects with the two working bodies, and also, work can be performed on various surfaces of the two or more work objects with the two working bodies.

The two link actuation devices or the two or more work objects are not individually moved along a determined straight line by two linear motion actuators as in the above examination example, but the two link actuation devices or the two or more work objects are moved along a determined straight line by one linear motion actuator with the interval therebetween kept constant. Therefore, the two link work devices can be moved beyond a center, in the right-left direction, of the composite work apparatus. Thus, the distance between the two or more work objects can be decreased, and as a result, the composite work apparatus can be compacted in overall size. When the two link actuation devices are moved by the first linear motion actuator, the two link actuation devices are kept at a constant interval therebetween, and thus there is no possibility that both link actuation devices interfere with each other.

Each of the link actuation devices includes: the proximal end side link hub, the distal end side link hub, and the three or more link mechanisms, all of which form a two-degrees-of-freedom mechanism in which the distal end side link hub is rotatable, relative to the proximal end side link hub, about two axes perpendicular to each other. The two-degrees-of-freedom mechanism is compact in size, but can achieve a wide range of movement of the distal end side link hub. For example, the maximum value of a bend angle between a central axis of the proximal end side link hub and a central axis of the distal end side link hub is about ±90°, and an angle of traverse of the distal end side link hub relative to the proximal end side link hub can be set in the range of 0° to 360°.

Since the link actuation devices are compact in size but have a wide operating range as described above, each of the link actuation devices can be configured such that a part of the mechanism for changing the posture of the working body is not substantially present around the working body, as compared to the case of changing the posture of the working body in the same manner using another mechanism. Accordingly, work can be performed with the working bodies made close to the work objects, and the composite work apparatus can be further compacted in overall size.

In the present invention, at least one of the three or more linear motion actuators may include two stages that are aligned along a movement direction of the linear motion actuator, and a movement body is fixed to each of the stages, the movement body including any of the two link actuation devices, the two or more work objects and the other linear motion actuators of the three or more linear motion actuators, are fixed. When the linear motion actuator is provided with the two stages, an effective stroke becomes short, but the rigidity of coupling portions between the linear motion actuator and the movement bodies improves. Thus, even when the weight capacity of the linear motion actuator is increased, high-speed operation of the linear motion actuator is enabled, and the time taken for one work is shortened, resulting in improvement of productivity.

In the present invention, the three or more linear motion actuators may be composed of three linear motion actuators including the first linear motion actuator, the second linear motion actuator and the third linear motion actuator, a mounting plate may be mounted on a stage of the first linear motion actuator, the second linear motion actuator and the third linear motion actuator may be mounted to the mounting plate, and the two link actuation devices may be mounted on the second linear motion actuator and the third linear motion actuator, respectively. With this configuration, work can be performed in a state where the work objects are fixed. Thus, the composite work apparatus is suitable for use in application in which the work objects are desired not to be moved, or for use in an automated line in which an operator does not place and take out the work objects.

In the case with the above configuration, the composite work apparatus may include a top plate horizontally provided above a floor, in which case the first linear motion actuator may be fixed to the top plate, and each link actuation device may be mounted such that the distal end side link hub is directed downward. When each distal end side link hub is directed downward, work can be performed on the work objects from above. Thus, the composite work apparatus is suitable for use in a manufacturing line in which the work objects flow on a conveyor line, for example. In the case of using the composite work apparatus in a manufacturing line, the two link actuation devices and the working bodies do not obstruct transfer of the work objects.

In the present invention, the two link actuation devices may be disposed such that one actuator of the posture control actuators provided to the two or more link mechanisms of one of the two link actuation devices and another one posture control actuator of the posture control actuators provided to the other two or more link mechanisms of the other of the two link actuation devices are parallel to each other on the same plane, and each of such one posture control actuators may be disposed so as to face outward with respect to the three or more link mechanisms. In this case, the distance between the two or more work objects can be shortened, and therefore, the entire apparatus can be compacted in size.

In the present invention, the three or more linear motion actuators and the respective posture control actuators of the two link actuation devices may be connected to each other via a communication network, and one controller configured to control the respective actuators may be provided. With this configuration, the controller can be shared for the two link actuation devices, and thus, cooperative control of the three or more linear motion actuators and the two link actuation devices can be achieved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF EMBODIMENTS

Figure 1:
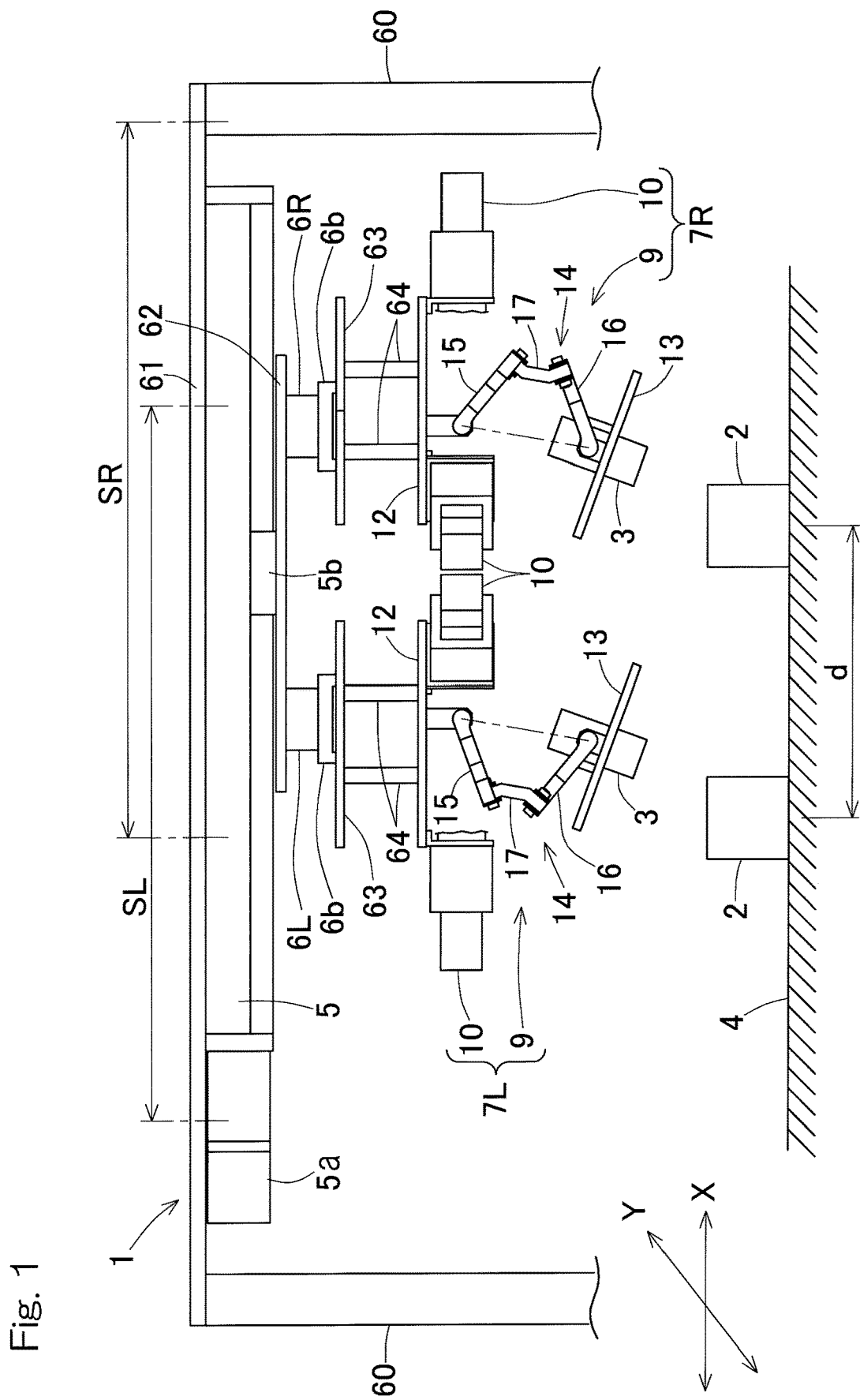
FIG. 1 is a front view of a state of a composite work apparatus according to a first embodiment of the present invention.
Figure 2:
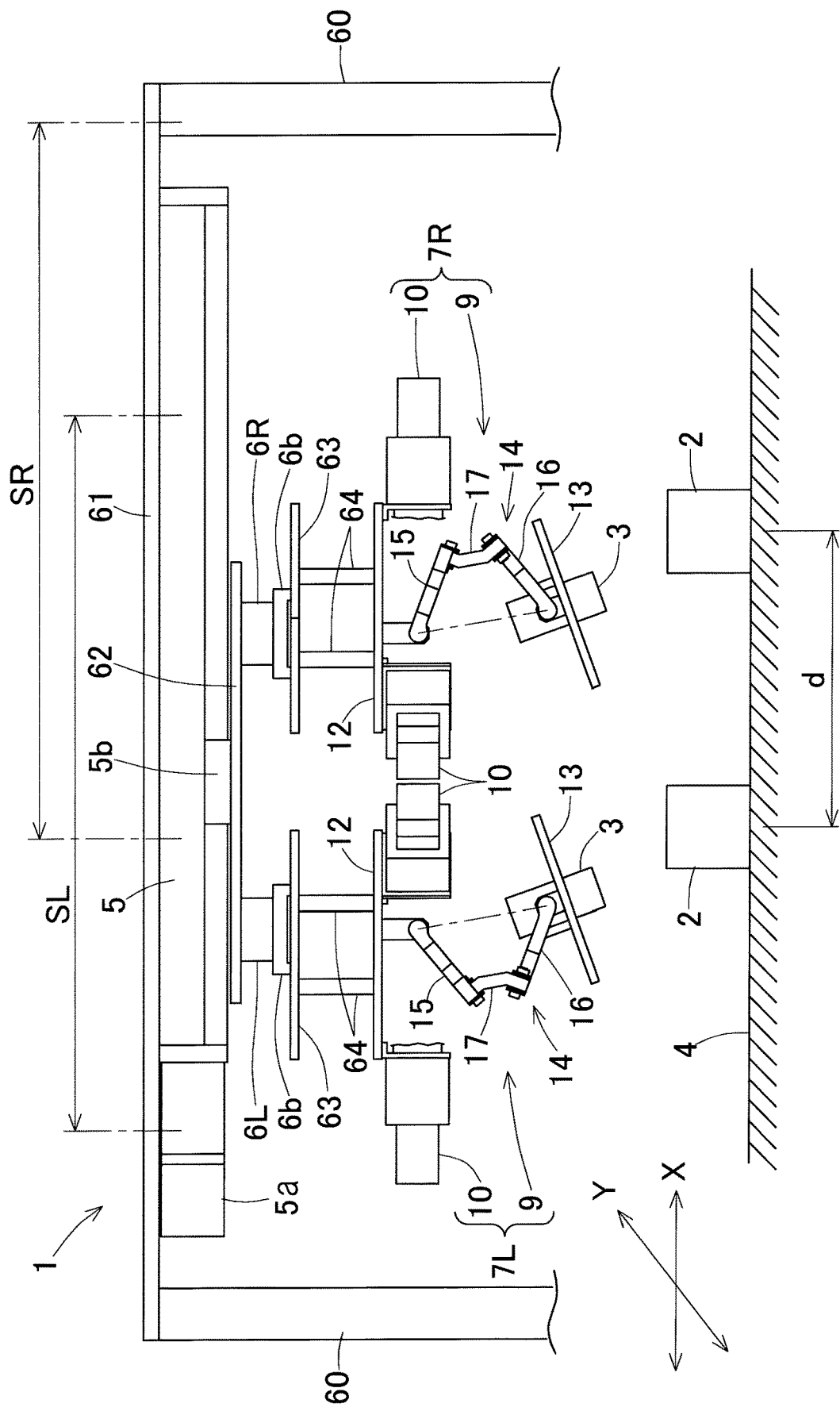
FIG. 2 is a front view of a different state of the composite work apparatus.
Figure 3:
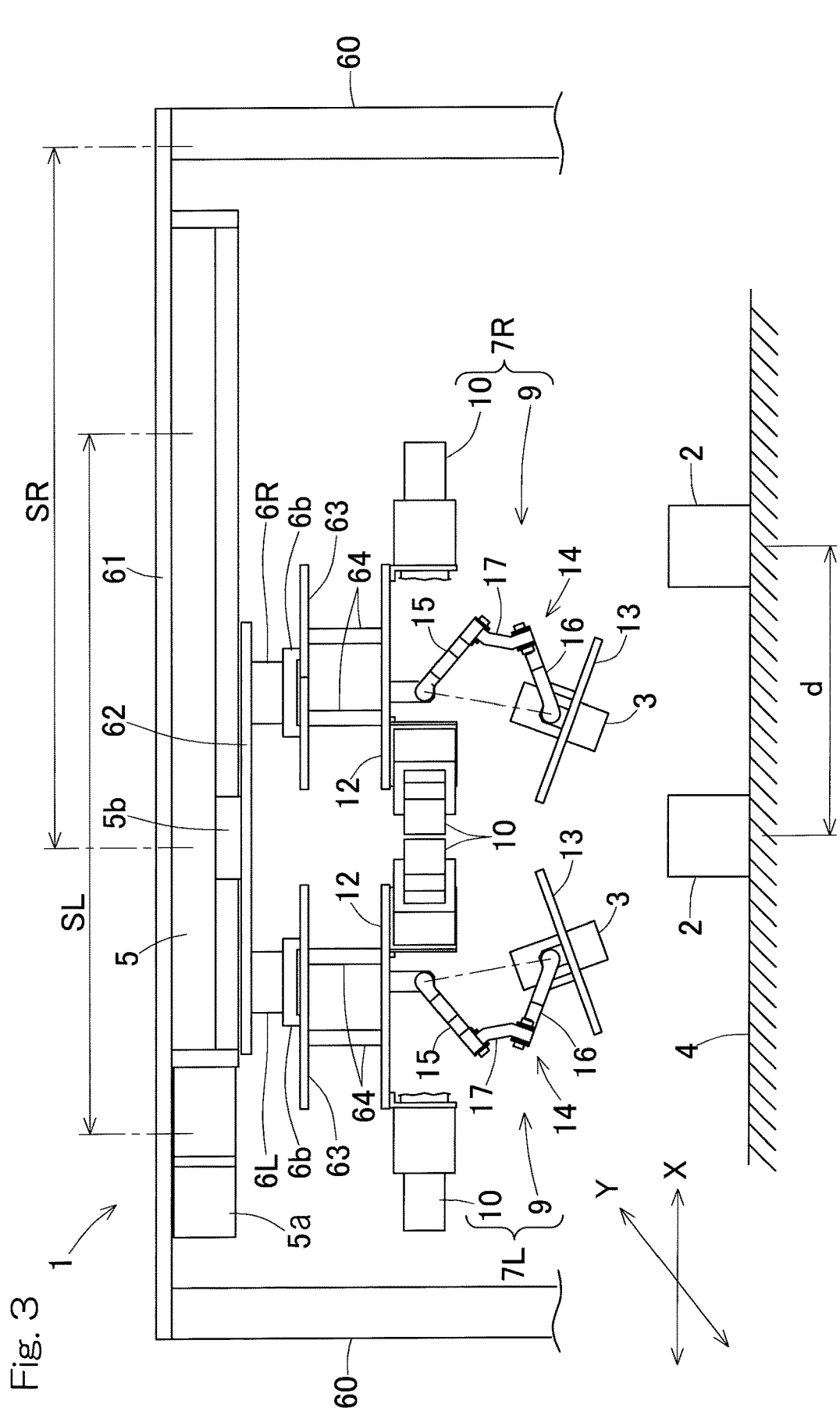
FIG. 3 is a front view of still a different state of the composite work apparatus.
Figure 4:
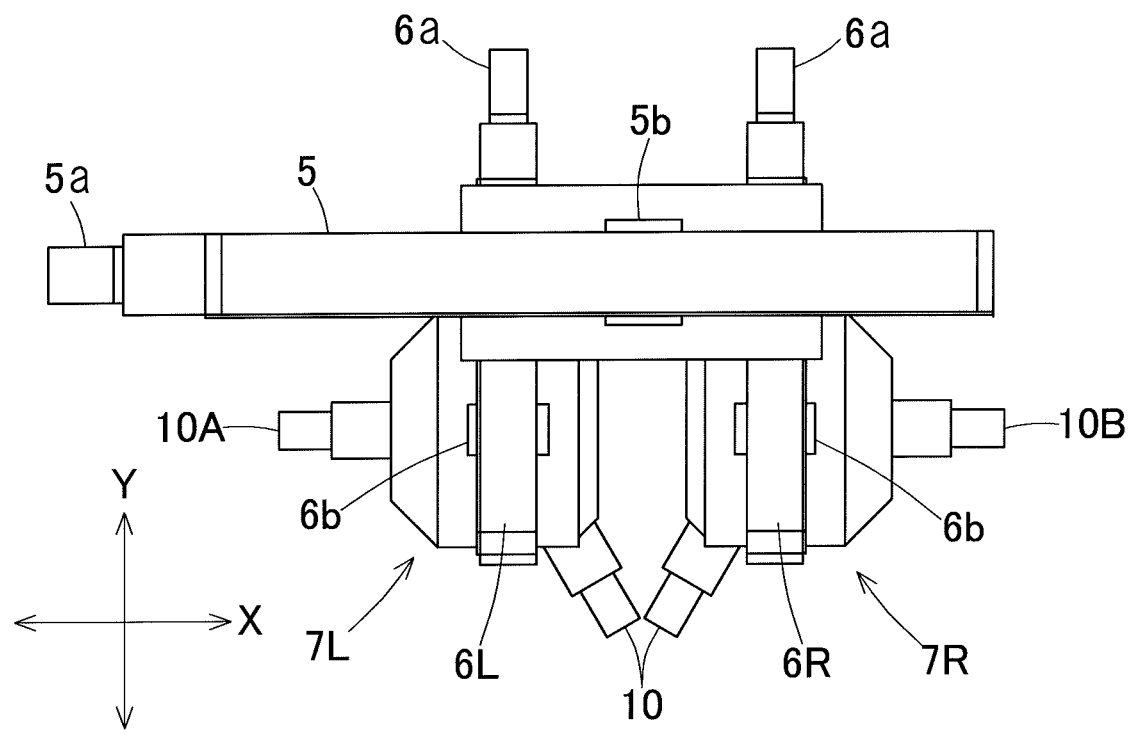
FIG. 4 is a plan view of a part of the composite work apparatus.

A composite work apparatus using link actuation devices according to a first embodiment of the present invention will be described with reference to FIG. 1 to FIG. 10. FIG. 1 to FIG. 3 are front views of different states of the composite work apparatus, and FIG. 4 is a plan view of a part of the composite work apparatus. The composite work apparatus 1 performs non-contact work on two work objects 2, 2 by using two working bodies 3, 3. The two work objects 2, 2 are placed on a horizontal floor 4 so as to be aligned in a right-left direction (X-axis direction) with a predetermined inter-work object distance d provided therebetween. The two working bodies 3, 3 are provided above the work objects 2, 2 so as to be movable in the right-left direction (X-axis direction) and in a front-rear direction (Y-axis direction). The postures of the two working bodies 3, 3 can be changed, and the two working bodies 3, 3 perform work on the work objects 2, 2 from above. Each working body 3 performs work in a non-contact manner on the work object 2, and is, for example, a grease coating machine, a laser inspection machine, a spray type coating machine, a welding machine and an appearance inspection machine.

As a means for moving the two working bodies 3, 3 in the right-left direction, a first linear motion actuator 5 is provided. The first linear motion actuator 5 is driven by a motor 5a. As a means for individually moving the two working bodies 3, 3 in the front-rear direction, second and third linear motion actuators 6L and 6R are provided. The second and third linear motion actuators 6L and 6R are driven by motors 6a, 6a (FIG. 10), respectively. As a means for individually changing the postures of the two working bodies 3, 3, two link actuation devices 7L and 7R are provided. The link actuation devices 7L and 7R will be described in detail later.

A top plate 61 is supported by a plurality of posts 60, and the first linear motion actuator 5 is mounted on the lower surface of the top plate 61. The first linear motion actuator 5 includes a stage 5b, and a mounting plate 62 that is long in the right-left direction is fixed to the stage 5b of the first linear motion actuator 5. The second and third linear motion actuators 6L and 6R are mounted on the left and right ends of the mounting plate 62, respectively. When the first linear motion actuator 5 has only the single stage 5b to which the mounting plate 62 is fixed as described above, effective strokes SL and SR of the respective link actuation devices 7L and 7R can be elongated. Each of the link actuation devices 7L and 7R has a later-described proximal end side link hub 12. The effective strokes SL and SR indicate the ranges of movement of a center of the proximal end side link hub 12.

Each of the second and third linear motion actuators 6L and 6R includes a stage 6b, and a link fixing plate 63 is fixed to each of the stages 6b, 6b. A plurality of suspension posts 64 extend downward from the respective link fixing plates 63, 63, and the two link actuation devices 7L and 7R are mounted on the lower ends of the suspension posts 64. That is, the two link actuation devices 7L and 7R are mounted in a suspended posture. By providing the suspension posts 64 between the link fixing plates 63, 63 and the proximal end side link hubs 12, wires and the like connected to the working bodies 3, 3, which are mounted on the distal ends of the link actuation devices 7L and 7R, can be taken out from between the link fixing plates 63, 63 and the proximal end side link hubs 12 through the internal space of parallel link mechanisms 9 to be discussed later.

The link actuation devices 7L and 7R will be described. The two link actuation devices 7L and 7R have the same configuration, and thus are designated by the same reference character "7" in the following description.

Figure 5:
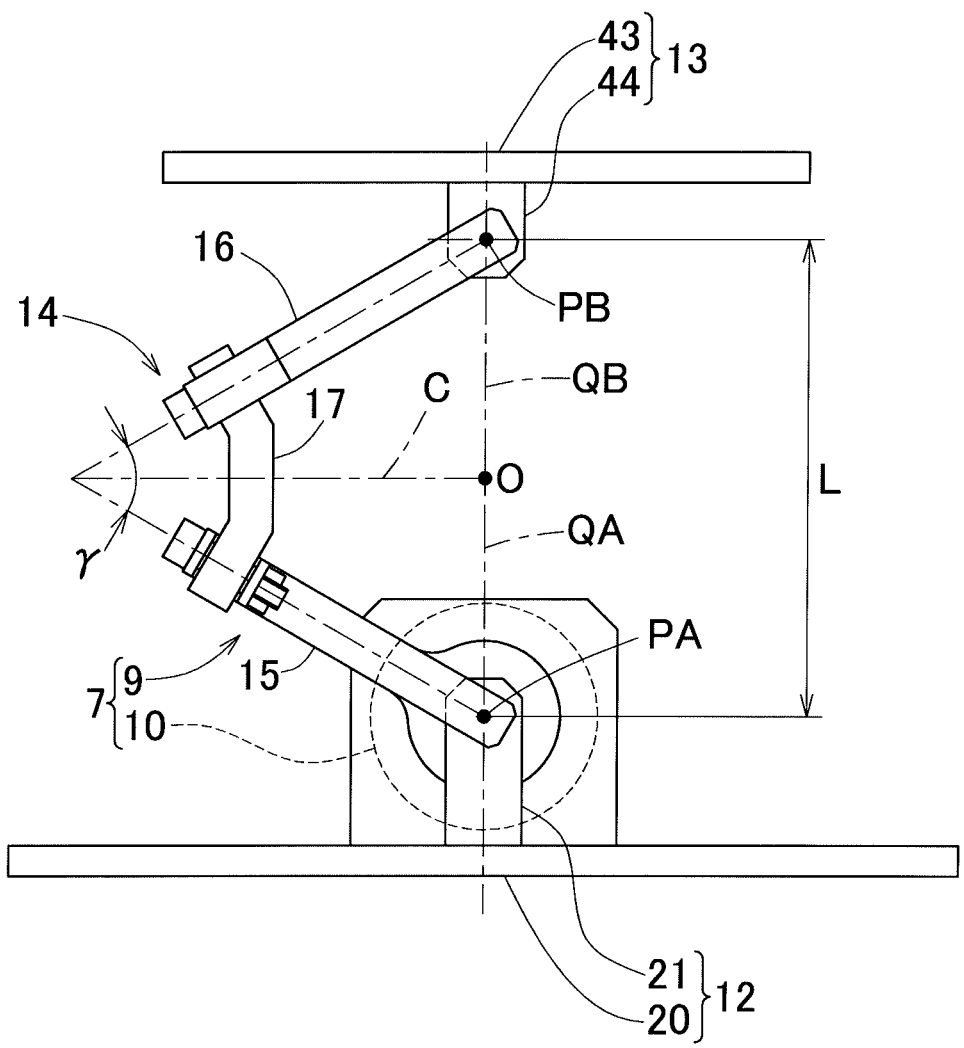
FIG. 5 is a front view of a link actuation device of the composite work apparatus, wherein a part thereof is omitted.
Figure 6:
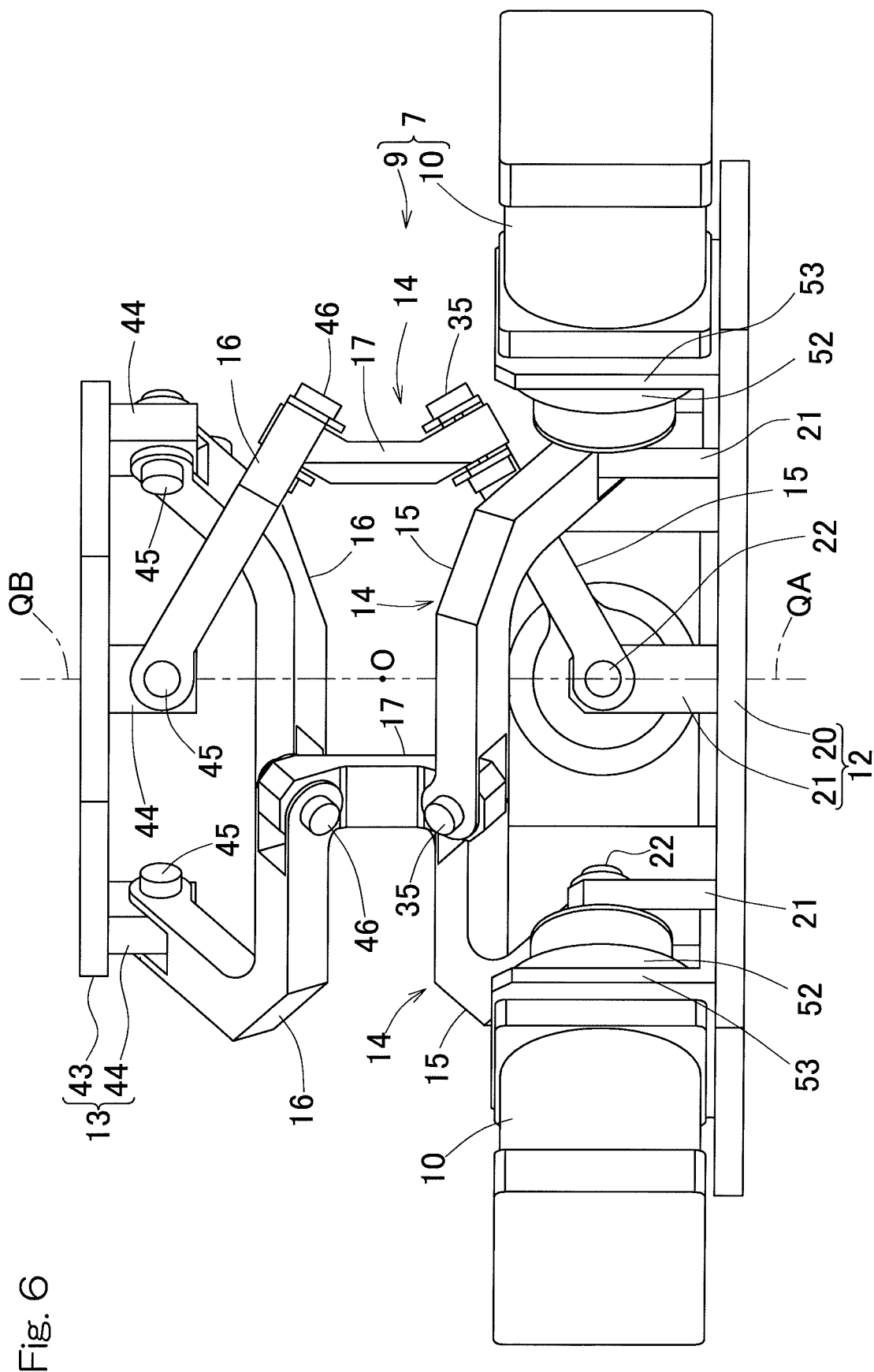
FIG. 6 is a perspective view of a state of the link actuation device.
Figure 7:
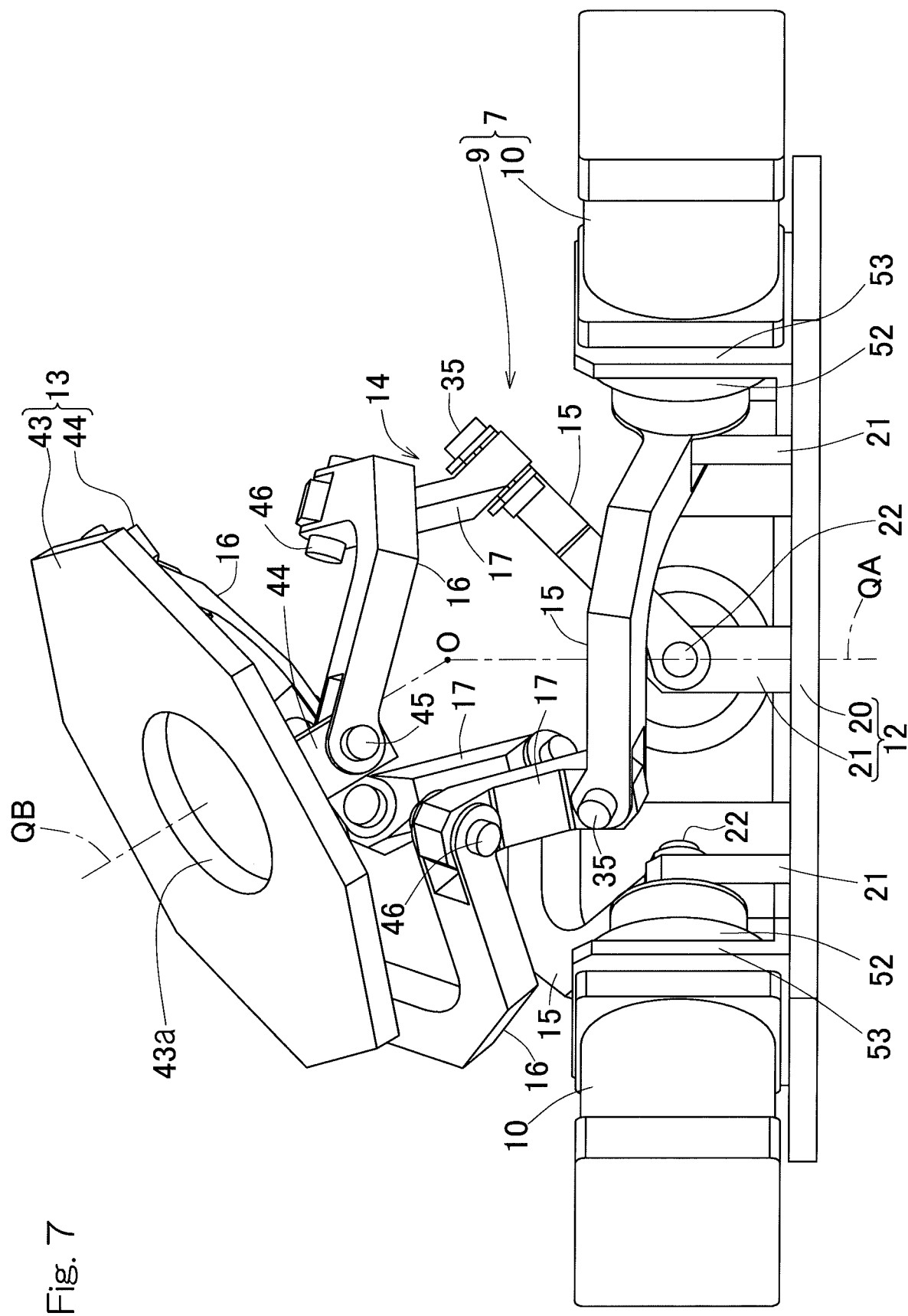
FIG. 7 is a perspective view of a different state of the link actuation device.

FIG. 5 is a front view of the link actuation device. FIG. 6 and FIG. 7 are perspective views showing different states of the link actuation device from each other. In these diagrams, the upper and lower sides are inverted with respect to FIG. 1 to FIG. 3. The link actuation device 7 includes the parallel link mechanism 9 and a posture control actuator 10 that operates the parallel link mechanism 9. The parallel link mechanism 9 includes the proximal end side link hub 12, a distal end side link hub 13 and three link mechanisms 14 which couple the distal end side link hub 13 to the proximal end side link hub 12 such that the posture of the distal end side link hub 13 relative to the proximal end side link hub 12 can be changed. In the state where the link actuation device 7 is mounted as shown in FIG. 1 to FIG. 3, the distal end side link hub 13 is directed downward. FIG. 5 shows only one link mechanism 14. The number of link mechanisms 14 may be four or more.

Each link mechanism 14 includes a proximal side end link member 15, a distal side end link member 16, and an intermediate link member 17, and forms a quadric chain link mechanism composed of four revolute pairs. The proximal side and distal side end link members 15 and 16 each have an L-shape. The proximal side end link member 15 has one end rotatably coupled to the proximal end side link hub 12. The distal side end link member 16 has one end rotatably coupled to the distal end side link hub 13. The intermediate link member 17 has opposite ends rotatably coupled to the other ends of the proximal side and distal side end link members 15 and 16, respectively.

Each parallel link mechanism 9 is formed by combining two spherical link mechanisms. The central axes of the revolute pairs between the link hubs 12, 13 and the end link members 15, 16 and the central axes of the revolute pairs between the end link members 15, 16 and the intermediate link member 17 intersect each other at proximal and distal end side spherical link centers PA and PB (FIG. 5). In addition, at the proximal end side and at the distal end side, the distances from the spherical link centers PA and PB to the revolute pairs between the link hubs 12, 13 and the end link members 15, 16 are equal to each other. The distances from the spherical link centers PA and PB to the revolute pairs between the end link members 15, 16 and the intermediate link member 17 are also equal to each other. The central axes of the revolute pairs between the end link members 15 and 16 and the intermediate link member 17 may form a certain cross angle γ, or may be parallel.

Figure 8A:
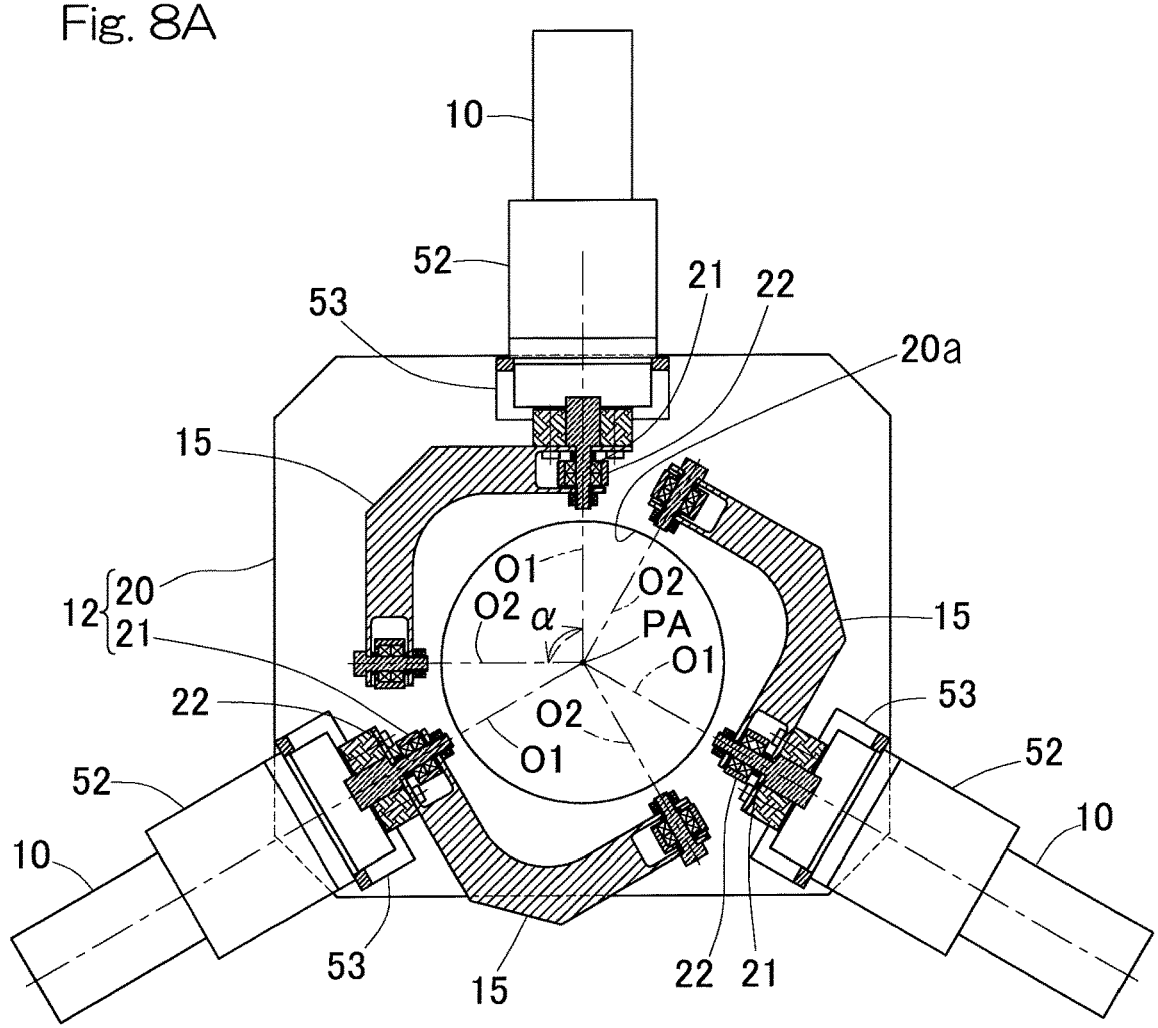
FIG. 8A is a cross-sectional view of a proximal end side link hub, proximal side end link members, etc. of the link actuation device.
Figure 8B:
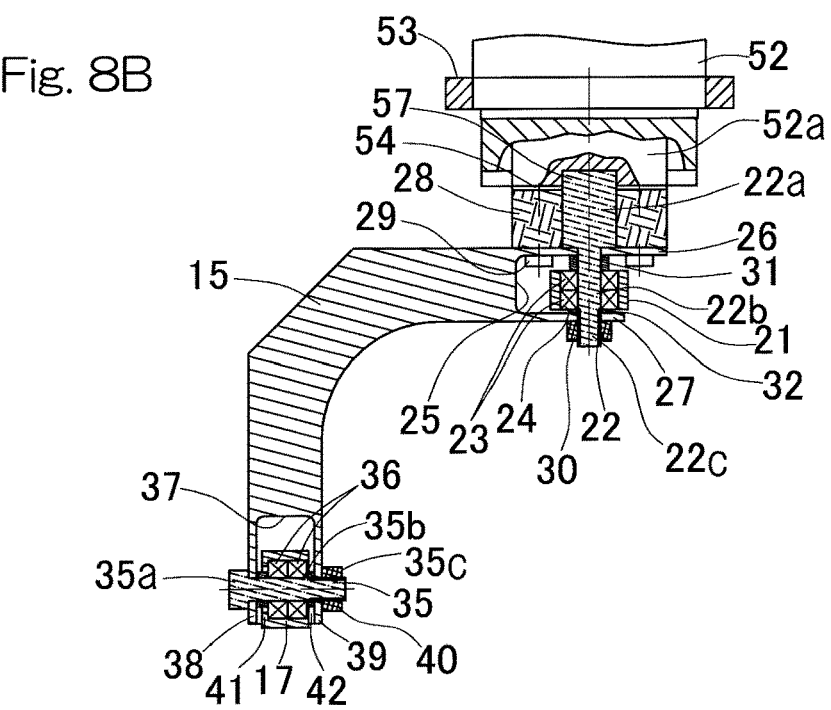
FIG. 8B is a partially enlarged view of FIG. 8A.

FIG. 8A shows a cross-sectional view of the proximal end side link hub 12 and the proximal side end link members 15, and FIG. 8B shows a partially enlarged view of FIG. 8A. FIG. 8A shows a relationship among the central axes O1 of the revolute pairs between the proximal end side link hub 12 and the proximal side end link members 15, the central axes O2 of the revolute pairs between the intermediate link members 17 and the proximal side end link members 15, and the spherical link center PA. The shapes and the positional relationship of the distal end side link hub 13 and the distal side end link members 16 are the same as in FIG. 8A (not shown). In FIG. 8A, the angle α formed by the central axis O1 of each of the revolute pairs between the link hubs 12, 13 and the end link members 15, 16 and the central axis O2 of each of the revolute pairs between the end link members 15, 16 and the intermediate link member 17 is set at 90°, but may be an angle other than 90°.

Figure 9:
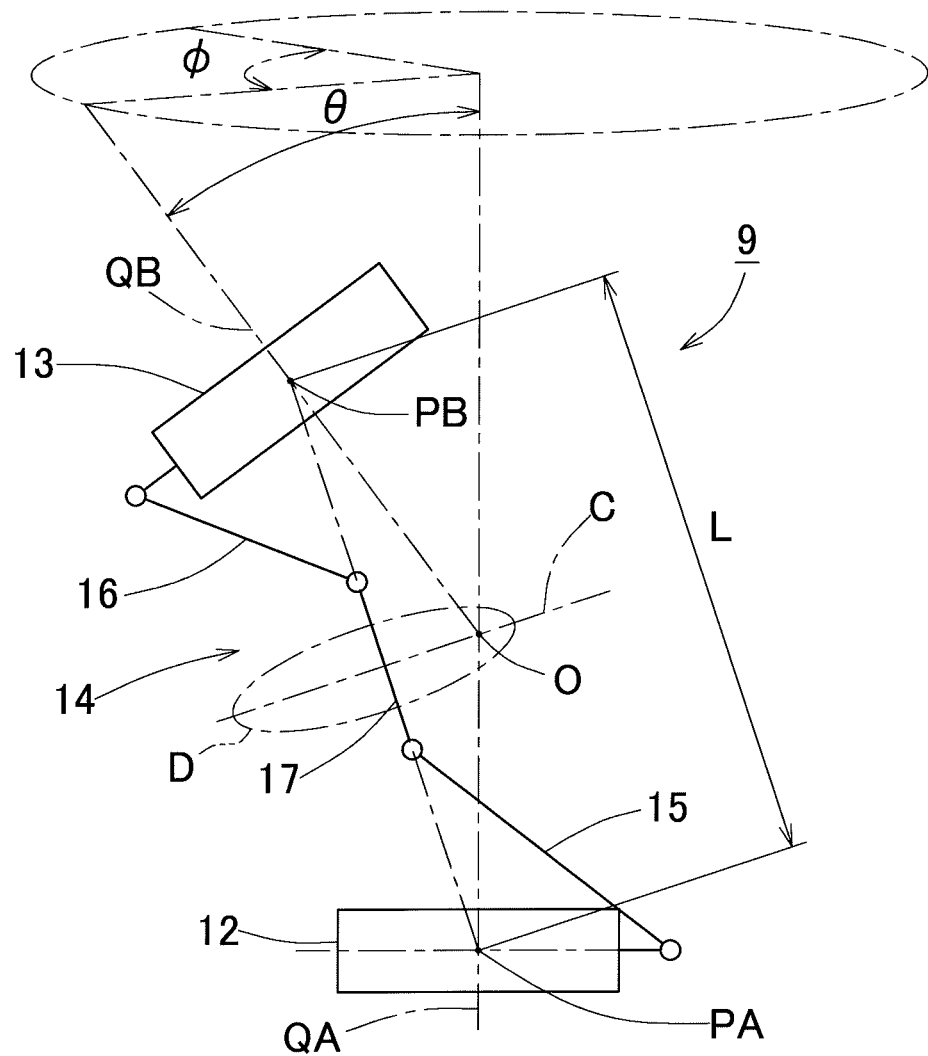
FIG. 9 is a diagram showing a link mechanism of the link actuation device depicted with straight lines.

The three link mechanisms 14 have a geometrically identical configuration. The geometrically identical configuration means that, as shown in FIG. 9, a geometric model depicted with straight lines representing the link members 15, 16, and 17, that is, a model depicted with the revolute pairs and straight lines connecting these revolute pairs represents a shape in which the proximal end side portion thereof and the distal end side portion thereof are symmetrical with each other with respect to the center portion of the intermediate link member 17. FIG. 9 is a diagram showing one link mechanism 14 depicted with straight lines. Each parallel link mechanism 9 according to this embodiment is of a rotation symmetrical type, and has a positional configuration in which the positional relationship between proximal side (the proximal end side link hub 12 and the proximal side end link member 15) and the distal side (the distal end side link hub 13 and the distal side end link member 16) is in rotation symmetry with respect to a center line C of the intermediate link member 17. The center portion of each intermediate link member 17 is located on a common orbital circle D.

The proximal end side link hub 12, the distal end side link hub 13, and the three link mechanisms 14 cooperate together to form a two-degrees-of-freedom mechanism in which the distal end side link hub 13 is rotatable, relative to the proximal end side link hub 12, about two axes perpendicular to each other. In other words, the distal end side link hub 13 is allowed to rotate with two degrees of freedom to change its posture, relative to the proximal end side link hub 12. This two-degrees-of-freedom mechanism is compact in size, but can achieve a wide range of movement of the distal end side link hub 13 relative to the proximal end side link hub 12.

For example, when straight lines that pass through the spherical link centers PA and PB and that intersect the central axes O1 (FIG. 8A) of the revolute pairs between the link hubs 12, 13 and the end link members 15, 16 at a right angle are defined as central axes QA and QB of the link hubs 12 and 13, the maximum value of a bend angle θ (FIG. 9) between the central axis QA of the proximal end side link hub 12 and the central axis QB of the distal end side link hub 13 can be about ±90°. In addition, an angle of traverse φ (FIG. 9) of the distal end side link hub 13 relative to the proximal end side link hub 12 can be set in the range of 0° to 360°. The bend angle θ means a vertical angle formed when the central axis QB of the distal end side link hub 13 is inclined relative to the central axis QA of the proximal end side link hub 12. The angle of traverse φ means a horizontal angle formed when the central axis QB of the distal end side link hub 13 is inclined relative to the central axis QA of the proximal end side link hub 12.

Change of the posture of the distal end side link hub 13 relative to the proximal end side link hub 12 is performed with, as a rotation center, the point of intersection O of the central axis QA of the proximal end side link hub 12 and the central axis QB of the distal end side link hub 13. FIG. 6 shows a state where the central axis QA of the proximal end side link hub 12 and the central axis QB of the distal end side link hub 13 coincide with each other. FIG. 7 shows a state where the central axis QB of the distal end side link hub 13 forms a certain operating angle relative to the central axis QA of the proximal end side link hub 12. Even when the posture is changed, the distance L (FIG. 9) between the proximal and distal end side spherical link centers PA and PB does not change.

In the parallel link mechanism 9, the proximal side (the proximal end side link hub 12 and each proximal side end link member 15) and the distal side (the distal end side link hub 13 and each distal side end link member 16) move in the same manner, due to the geometrical symmetry, if the angular positional relationships between the intermediate link member 17 and the end link members 15, 16 with respect to the symmetry plane of the intermediate link member 17 are made identical between the proximal end side and the distal end side when: the angles of the central axes O1 of the revolute pairs between the link hubs 12, 13 and the end link members 15, 16 in each link mechanism 14 and the distances from the spherical link centers PA, PB to the revolute pairs between the link hubs 12, 13 and the end link members 15, 16 are equal to each other; the central axes O1 of the revolute pairs between the link hubs 12, 13 and the end link members 15, 16 of each link mechanism 14 and the central axes O2 of the revolute pairs between the end link members 15, 16 and the intermediate link member 17 intersect the spherical link centers PA and PB at the proximal end side and the distal end side; the geometrical shapes of the proximal side end link member 15 and the distal side end link member 16 are the same; and the shape of the intermediate link member 17 is the same between the proximal end side and the distal end side.

As shown in FIG. 5 to FIG. 7, the proximal end side link hub 12 includes a flat plate-shaped base end member 20 fixed to the lower ends of the suspension posts 64, and three rotation shaft coupling members 21 provided so as to be integrated with the base end member 20. The base end member 20 has a circular through hole 20a (FIG. 8A) defined in a center portion thereof, and the three rotation shaft coupling members 21 are arranged around the through hole 20a at equal intervals in the circumferential direction. The center of the through hole 20a is located on the proximal end side link hub central axis QA. A rotation shaft 22 is rotatably coupled to each rotation shaft coupling member 21, which shaft 22 has an axis that intersects the proximal end side link hub central axis QA. The one end of the proximal side end link member 15 is coupled to the rotation shaft 22.

FIG. 8B is an enlarged sectional view showing one proximal side end link member 15 and the areas surrounding both ends thereof. As shown in FIG. 8B, the rotation shaft 22 has a large-diameter portion 22a, a small-diameter portion 22b and a male thread portion 22c, and is rotatably supported at the small-diameter portion 22b by the rotation shaft coupling member 21 via two bearings 23. Each bearing 23 is a ball bearing such as a deep groove ball bearing and an angular contact ball bearing. These bearings 23 are mounted in an inner-diameter groove 24 provided in the rotation shaft coupling member 21, in a state of being fitted therein, and are fixed by a method such as press-fit, adhesion and crimping. The same applies to the type of and a mounting method for bearings provided to other revolute pair sections.

The rotation shaft 22 is coaxially arranged at the large-diameter portion 22a thereof on an output shaft 52a of a later-described speed reduction mechanism 52. The arrangement structure thereof will be described later. In addition, the one end of the proximal side end link member 15 is coupled to the rotation shaft 22 so as to be rotatable integrally with the rotation shaft 22. Specifically, the rotation shaft coupling member 21 is disposed within a cut portion 25 formed at the one end of the proximal side end link member 15. The small-diameter portion 22b of the rotation shaft 22 is inserted in the inner rings of the bearings 23 and through holes formed in a pair of outer and inner rotation shaft support portions 26 and 27 that form both side portion of the cut portion 25 at the one end of the proximal side end link member 15. The proximal side end link member 15 and the output shaft 52a of the speed reduction mechanism 52 are fixed to each other by bolts 29 via a spacer 28 fitted to the outer periphery of the large-diameter portion 22a of the rotation shaft 22. Also, a nut 30 is screwed to the male thread portion 22c of the rotation shaft 22 that projects from the inner rotation shaft support portion 27 radially inwardly. Spacers 31 and 32 are interposed between the inner rings of the bearings 23 and the pair of rotation shaft support portions 26 and 27, and a preload is applied to the bearings 23 when screwing the nut 30.

A rotation shaft 35 is rotatably coupled to one end of the intermediate link member 17 and is coupled to the other end of the proximal side end link member 15. Similar to the rotation shaft 22 at the link hub 12, the rotation shaft 35 at the intermediate link member 17 has a large-diameter portion 35a, a small-diameter portion 35b and a male thread portion 35c and is rotatably supported at the small-diameter portion 35b by the one end of the intermediate link member 17 via two bearings 36. Specifically, the one end of the intermediate link member 17 is disposed within a cut portion 37 formed at the other end of the proximal side end link member 15. The small-diameter portion 35b of the rotation shaft 35 is inserted in the inner rings of the bearings 36 and through holes formed in a pair of outer and inner rotation shaft support portions 38 and 39 that form both side portion of the cut portion 37 at the other end of the proximal side end link member 15. A nut 40 is screwed to the male thread portion 35c of the rotation shaft 35 that projects from the inner rotation shaft support portion 39 radially inwardly. Spacers 41 and 42 are interposed between the inner rings of the bearings 36 and the pair of rotation shaft support portions 38 and 39, and a preload is applied to the bearings 36 when screwing the nut 40.

As shown in FIG. 5 to FIG. 7, the distal end side link hub 13 includes a flat plate-shaped distal end member 43 having a circular through hole 43a (FIG. 7) defined in a center portion thereof, and three rotation shaft coupling members 44 provided around the through hole 43a of the distal end member 43 equidistantly in the circumferential direction. The center of the through hole 43a is located on the central axis QB of the distal end side link hub 13. A rotation shaft 45 is rotatably coupled to each rotation shaft coupling member 44, which shaft 45 has an axis that intersects the central axis QB of the distal end side link hub 13. The one end of the distal side end link member 16 is coupled to the rotation shaft 45 at the distal end side link hub 13. A rotation shaft 46 is rotatably coupled to the other end of the intermediate link member 17 and is coupled to the other end of the distal side end link member 16. The rotation shaft 45 at the distal end side link hub 13 and the rotation shaft 46 at the intermediate link member 17 also have the same shape as the rotation shaft 35 and are rotatably coupled to the rotation shaft coupling member 44 and the other end of the intermediate link member 17, respectively, via two bearings (not shown).

The posture control actuator 10 of the link actuation device 7 is a motor provided with the speed reduction mechanism 52, and is mounted on the upper surface of the base end member 20 of the proximal end side link hub 12 so as to be coaxial with the rotation shaft 22. The posture control actuator 10 and the speed reduction mechanism 52 are integrally provided, and the speed reduction mechanism 52 is fixed to the base end member 20 via a motor fixing member 53. In this example, the posture control actuator 10 is provided to each of the three link mechanisms 14. However, when the posture control actuator 10 is provided to each of at least two of the three link mechanisms 14, the posture of the distal end side link hub 13 relative to the proximal end side link hub 12 can be determined.

In FIG. 8B, the speed reduction mechanism 52 is of a flange output type and has the large-diameter output shaft 52a. The distal end surface of the output shaft 52a forms a flat flange surface 54 perpendicular to the center line of the output shaft 52a. The output shaft 52a is connected to the rotation shaft support portion 26 of the proximal side end link member 15 via the spacer 23 by the bolts 29. The large-diameter portion 22a of the rotation shaft 22 at a revolute pair section between the proximal end side link hub 12 and the proximal side end link member 15 is fitted into an inner-diameter groove 57 provided in the output shaft 52a of the speed reduction mechanism 52.

As shown in FIG. 6, the respective posture control actuators 10 are disposed so as to face outward with respect to the three link mechanisms 14. In addition, as shown in FIG. 4, in the state where the two link actuation devices 7L and 7R are mounted, the posture control actuators 10 are disposed such that one posture control actuator 10A of the three posture control actuators 10 and one posture control actuator 10B of the other three posture control actuators 10 are parallel to each other on the same plane. In the state shown in FIG. 4, the two link actuation devices 7L and 7R are located at the same position in the front-rear direction, and thus the posture control actuators 10A and 10B are located so as to be coaxial with each other.

In FIG. 1 to FIG. 3, each working body 3 is mounted to the distal end side link hub 13 so as to penetrate the through hole 43a (FIG. 7) of the distal end member 43. For example, in the case where the working body 3 is a grease coating machine, the working body 3 is mounted such that a grease nozzle serving as an end effector is directed downward.

Figure 10:
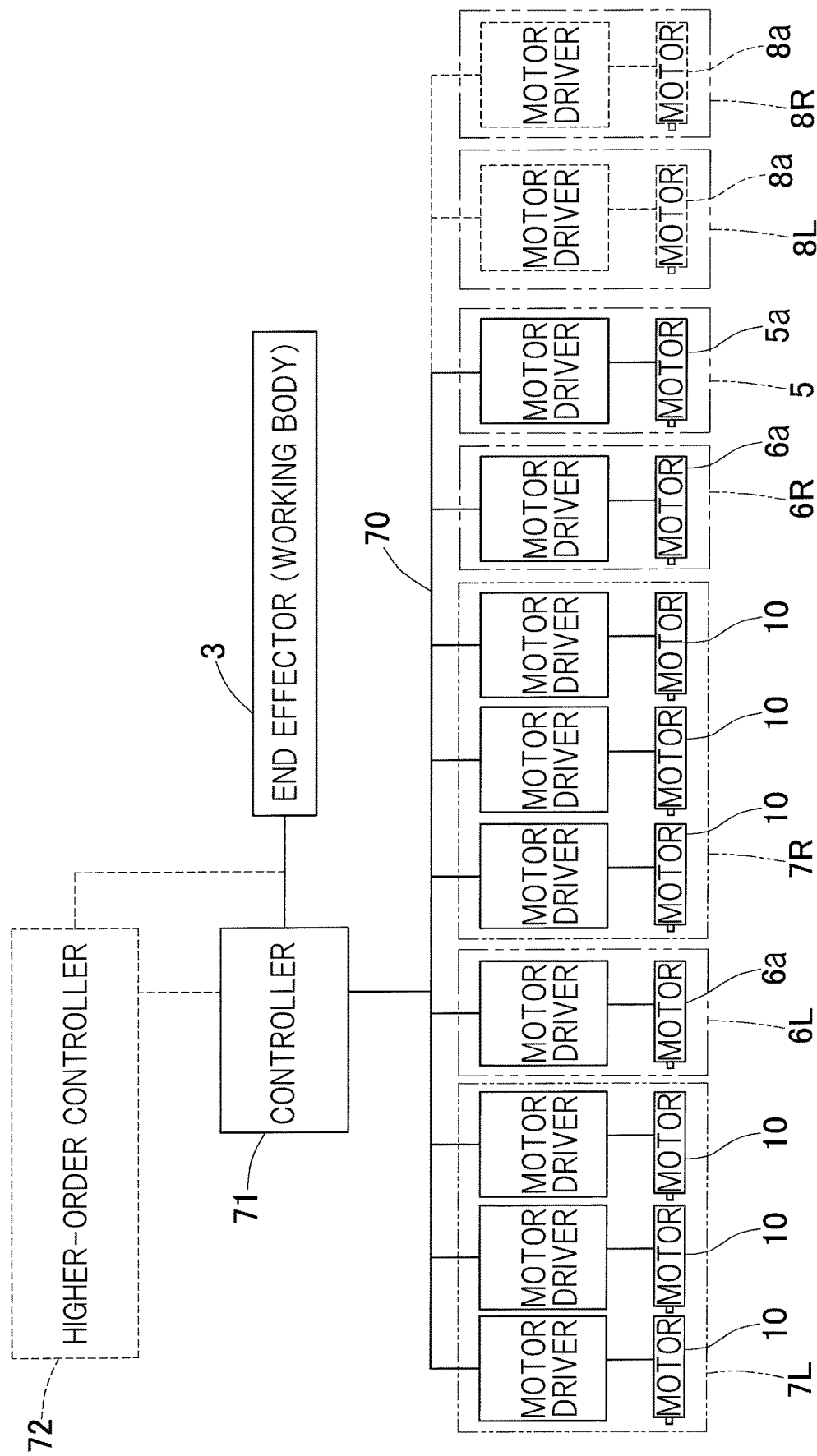
FIG. 10 is a block diagram showing a control system of the composite work apparatus.

FIG. 10 is a block diagram showing a control system for the composite work apparatus. Motor drivers for driving the motors 5a, 6a and 6a of the first to third linear motion actuators 5, 6L and 6R and the respective posture control actuators (motors) 10 of the two link actuation devices 7L and 7R are connected to each other via a communication network 70. The communication network 70 is connected to one controller 71, and the motors 5a, 6a and 6a and the posture control actuators 10 are controlled by the one controller 71.

The controller 71 is connected to the end effectors of the working bodies 3 and operates the end effectors of the working bodies 3 in conjunction with operation of the linear motion actuators 5, 6L and 6R and the link actuation devices 7L and 7R. Accordingly, the controller 71 can be shared for the two link actuation devices 7L and 7R, and thus cooperative control of the linear motion actuators 5, 6L and 6R and the two link actuation devices 7L and 7R can be achieved. As shown by broken lines in FIG. 10, a higher-order controller 72 may be connected to the controller 71 and the working bodies 3 to manage the controller 71 and the working bodies 3.

The composite work apparatus 1 using the link actuation devices is configured with one degree of freedom of each of the first to third linear motion actuators 5, 6L and 6R and two degrees of freedom of each of the two link actuation devices 7L and 7R, that is, with seven degrees of freedom in total. During use, under control of the controller 71, the two link actuation devices 7L and 7R are moved in the right-left direction by the first linear motion actuator 5, and the two link actuation devices 7L and 7R are moved by the second linear motion actuator 6L and the third linear motion actuator 6R in the front-rear direction perpendicular to the movement direction of the first linear motion actuator 5. Additionally, the postures of the working bodies 3, 3 are changed by the link actuation devices 7L and 7R. Accordingly, various types of work can be performed on the two work objects 2, 2 with the two working bodies 3, 3. Change of the postures of the working bodies 3, 3 can be performed by the link actuation devices 7L and 7R at high speed and with high accuracy, and thus, high-speed and high accuracy work can be performed.

FIG. 1 shows a state where the two link actuation devices 7L and 7R are moved to a position rightward of the center, in the right-left direction, of the composite work apparatus 1; the postures of the two link actuation devices 7L and 7R are set such that the distal end side link hubs 13, 13 are inclined upward to the left; and work is performed on the work objects 2, 2 with the working bodies 3, 3 from the right side.

FIG. 2 shows a state where the two link actuation devices 7L and 7R are moved to a position leftward of the center, in the right-left direction, of the composite work apparatus 1; the postures of the two link actuation devices 7L and 7R are set such that the distal end side link hubs 13, 13 are inclined upward to the right; and work is performed on the work objects 2, 2 with the working bodies 3, 3 from the left side.

FIG. 3 shows a state where the posture of the one link actuation device 7L is set such that the distal end side link hub 13 is inclined upward to the right; the posture of the other link actuation device 7R is set such that the distal end side link hub 13 is inclined upward to the left; and work is simultaneously performed on the one work object 2 (the left work object 2 of FIG. 3) with the two working bodies 3, 3.

As described above, work can be performed on the two work objects 2, 2 with the two working bodies 3, 3, respectively, and work can be simultaneously performed on the one work object 2 with the two working bodies 3, 3. In addition, changing the postures of the working bodies 3 by the link actuation devices 7L and 7R allows work to be performed on various surfaces of the work object 2. In the example of FIG. 1 to FIG. 3, the number of work objects 2 is two, but three or more work objects 2 may be placed. In this case as well, work is allowed to be performed on various surfaces of each work object 2.

Figure 16:
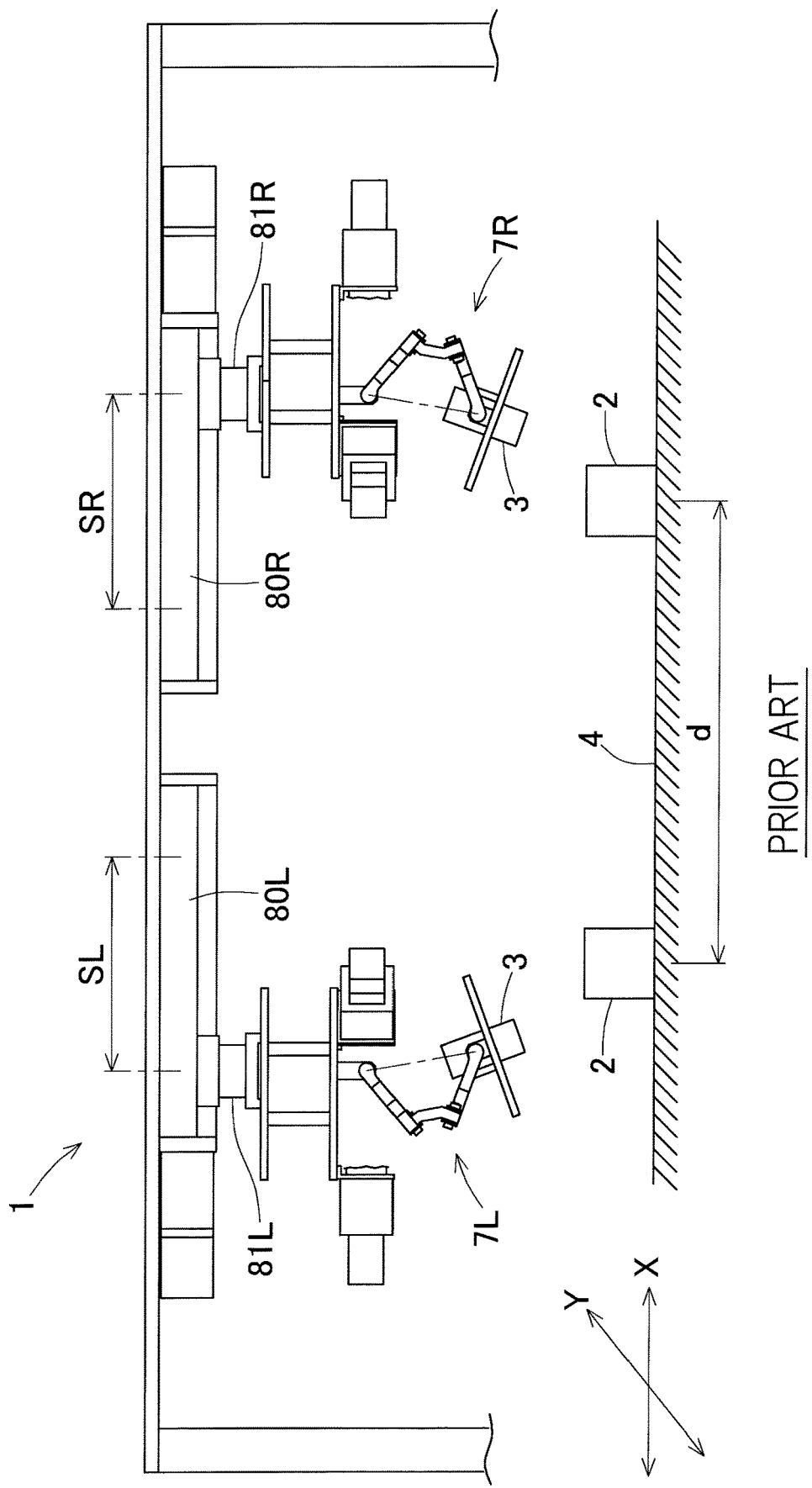
FIG. 16 is a front view of a state of a composite work apparatus of an examination example.
Figure 17:
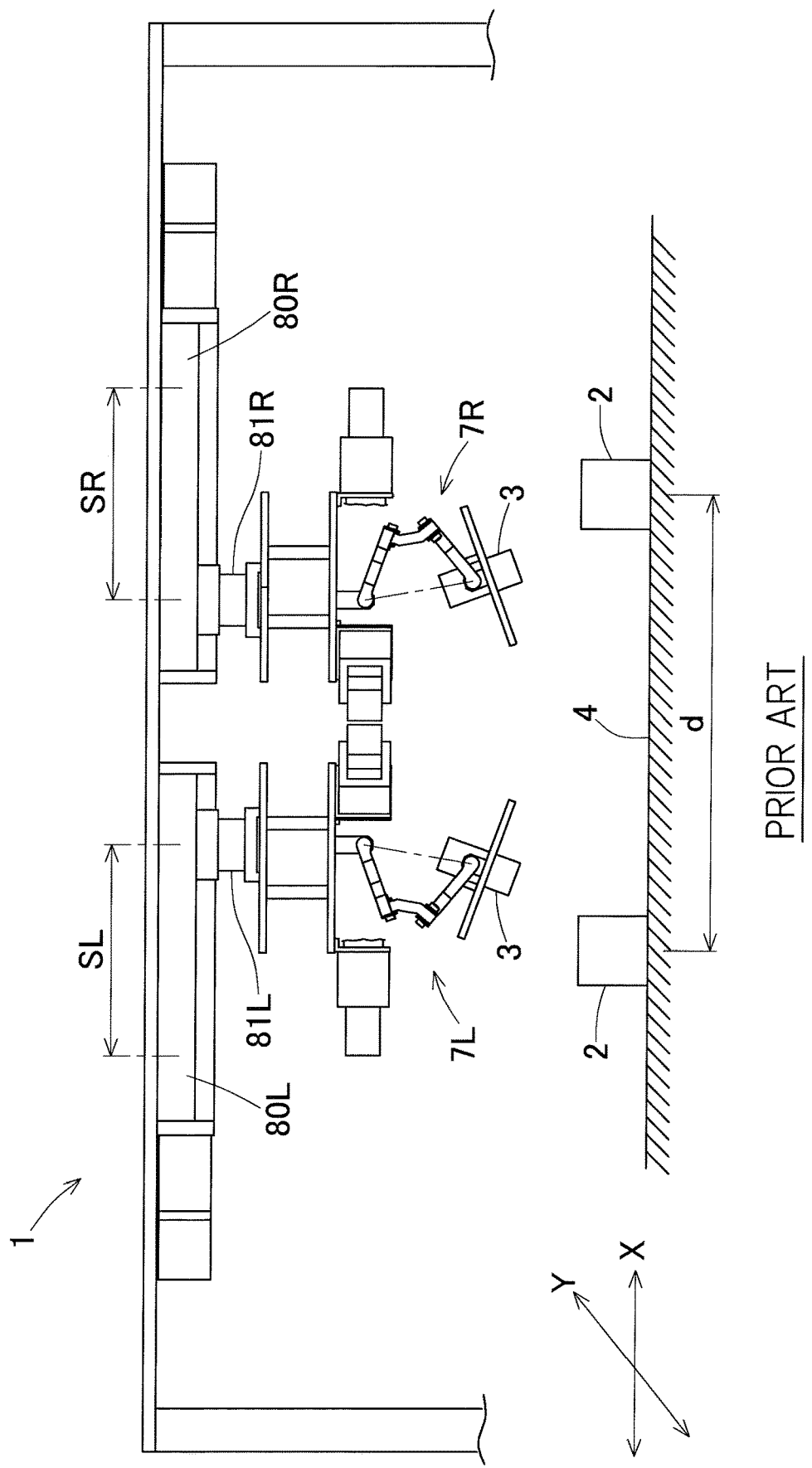
FIG. 17 is a front view of a different state of the composite work apparatus.

The composite work apparatus 1 in FIG. 1 to FIG. 10 does not individually move the two link actuation devices 7L and 7R along a determined line by the two linear motion actuators 5L and 5R as in the examination example of FIG. 16 and FIG. 17, but move the two link actuation devices 7L and 7R along a determined straight line by the one linear motion actuator 5 with the interval therebetween kept constant. Thus, the two link work devices 7L and 7R are movable beyond the center, in the right-left direction, of the composite work apparatus 1. Accordingly, the inter-work object distance d between the two work objects 2, 2 can be decreased, and as a result, the composite work apparatus 1 can be compacted in overall size. Since the two link actuation devices 7L and 7R are moved with the interval therebetween kept constant, both link actuation devices 7L and 7R do not interfere with each other.

As described above, the link actuation devices 7L and 7R include mechanisms that are compact in size but have a wide operating range. Therefore, each of the link actuation devices 7L and 7R can be configured such that a part of the mechanism for changing the posture of the working body 3 is not substantially present around the working body 3, as compared to the case of changing the posture of the working body in the same manner using another mechanism. Accordingly, work can be performed with the working bodies 3 made close to the work objects 2, and also, the composite work apparatus 1 can be further compacted in overall size.

In the composite work apparatus 1 according to the first embodiment, the mounting plate 62 is mounted on the stage 5b of the first linear motion actuator 5, the second linear motion actuator 6L and the third linear motion actuator 6R are fixed to the mounting plate 62, and the two link actuation devices 7L and 7R are mounted on the second linear motion actuator 6L and the third linear motion actuator 6R, respectively. Work is performed on the work objects 2, 2 in a fixed state with the working bodies 3, 3, which are supported by the link actuation devices 7L and 7R such that the postures of the working bodies 3, 3 can be changed. Thus, the composite work apparatus 1 is suitable for use in application in which the work objects 2 are desired not to be moved, or for use in an automated line in which an operator does not place and take out the work objects 2.

In the composite work apparatus 1 according to this embodiment, the link actuation devices 7L and 7R are mounted above the work objects 2, 2 such that the distal end side link hubs 13 are directed downward, and work is performed on the work objects 2, 2 from above with the working bodies 3, 3, which are supported by the link actuation devices 7L and 7R. Thus, the composite work apparatus 1 is also suitable for use in a manufacturing line in which the work objects 2, 2 are not placed on the floor 4 at fixed positions as in FIG. 1 to FIG. 3, but flow on a conveyor line, for example. Since the link actuation devices 7L and 7R are mounted above the work objects 2, 2, in the case of using the composite work apparatus 1 in a manufacturing line, the two link actuation devices 7L, 7R and the working bodies 3, 3 do not obstruct transfer of the work objects 2, 2.

The two link actuation devices 7L and 7R are disposed such that the posture control actuators 10A and 10B (FIG. 4) are parallel to each other on the same plane, and each of the posture control actuators 10A and 10B is disposed so as to face outward with respect to the three or more link mechanisms 14. With such a configuration, the inter-work object distance d between the two work objects 2, 2 can be shortened, and as a result, the entire apparatus can be compacted in size.

Other embodiments of the present invention will be described. In the following description, in each embodiment, portions corresponding to the matters described in the preceding embodiments are designated by the same reference numerals, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 11:
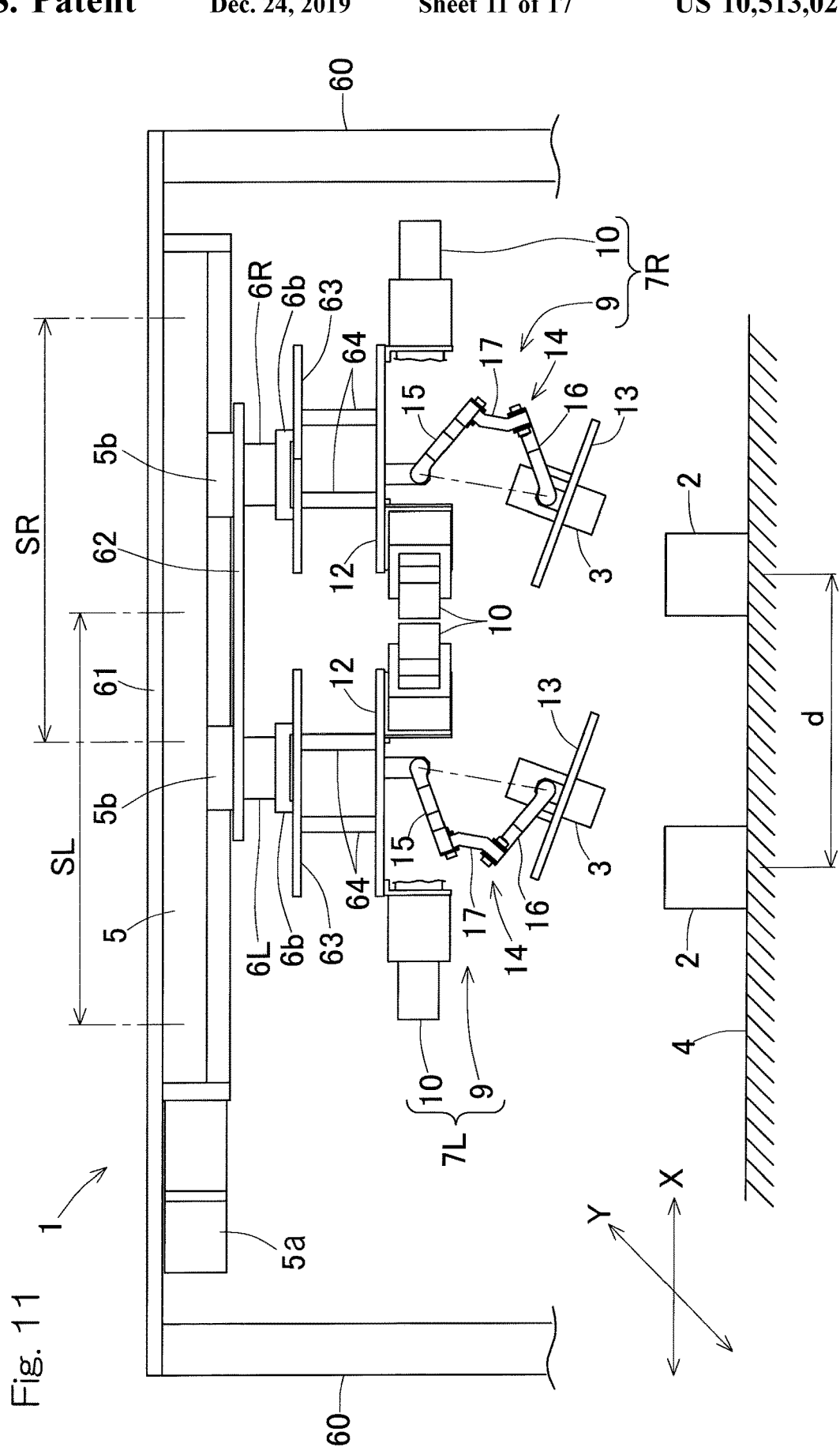
FIG. 11 is a front view of a state of a composite work apparatus according to a second embodiment of the present invention.
Figure 12:
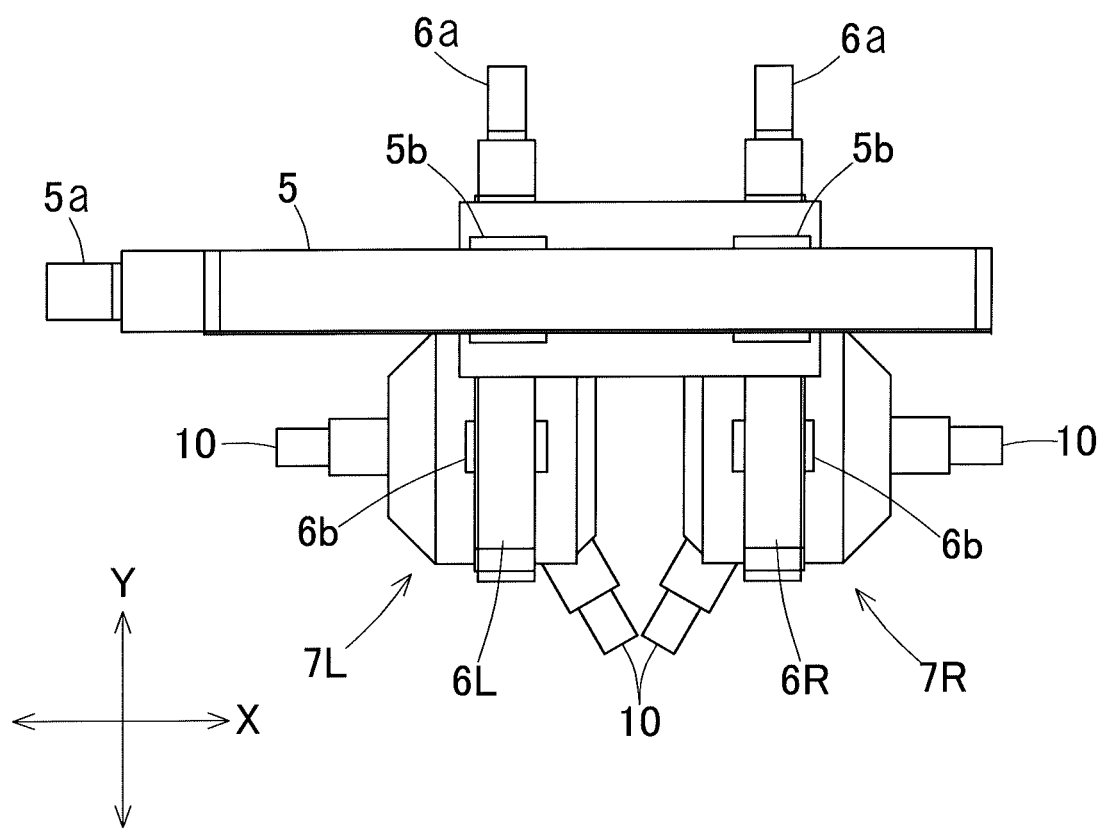
FIG. 12 is a plan view of a part of the composite work apparatus.

FIG. 11 and FIG. 12 show a second embodiment of the present invention. In the composite work apparatus 1, the first linear motion actuator 5 has two stages 5b, 5b, to which the mounting plate 62 is fixed, and the second and third linear motion actuators 6L and 6R are mounted on the mounting plate 62. When the mounting plate 62 is fixed to the two stages 5b, 5b as described above, the effective strokes SL and SR of the link actuation devices 7L and 7R become shorter than those in the case with the single stage 5b (the first embodiment shown in FIG. 1 to FIG. 3), but the rigidity of coupling portions between the first linear motion actuator 5 and the second and third linear motion actuators 6L and 6R that form movement bodies improves. Thus, even when the weight capacity of the first linear motion actuator 5 is increased, high-speed operation of the first linear motion actuator 5 is enabled, and the time taken for one work is shortened, resulting in improvement of productivity.

Each embodiment described below is different from the first embodiment shown in FIG. 1 to FIG. 3, in a configuration for moving the two work objects 2, 2 relative to the two link actuation devices 7L and 7R, which support the two working bodies 3, 3 such that the postures of the working bodies 3, 3 can be individually changed.

Figure 13:
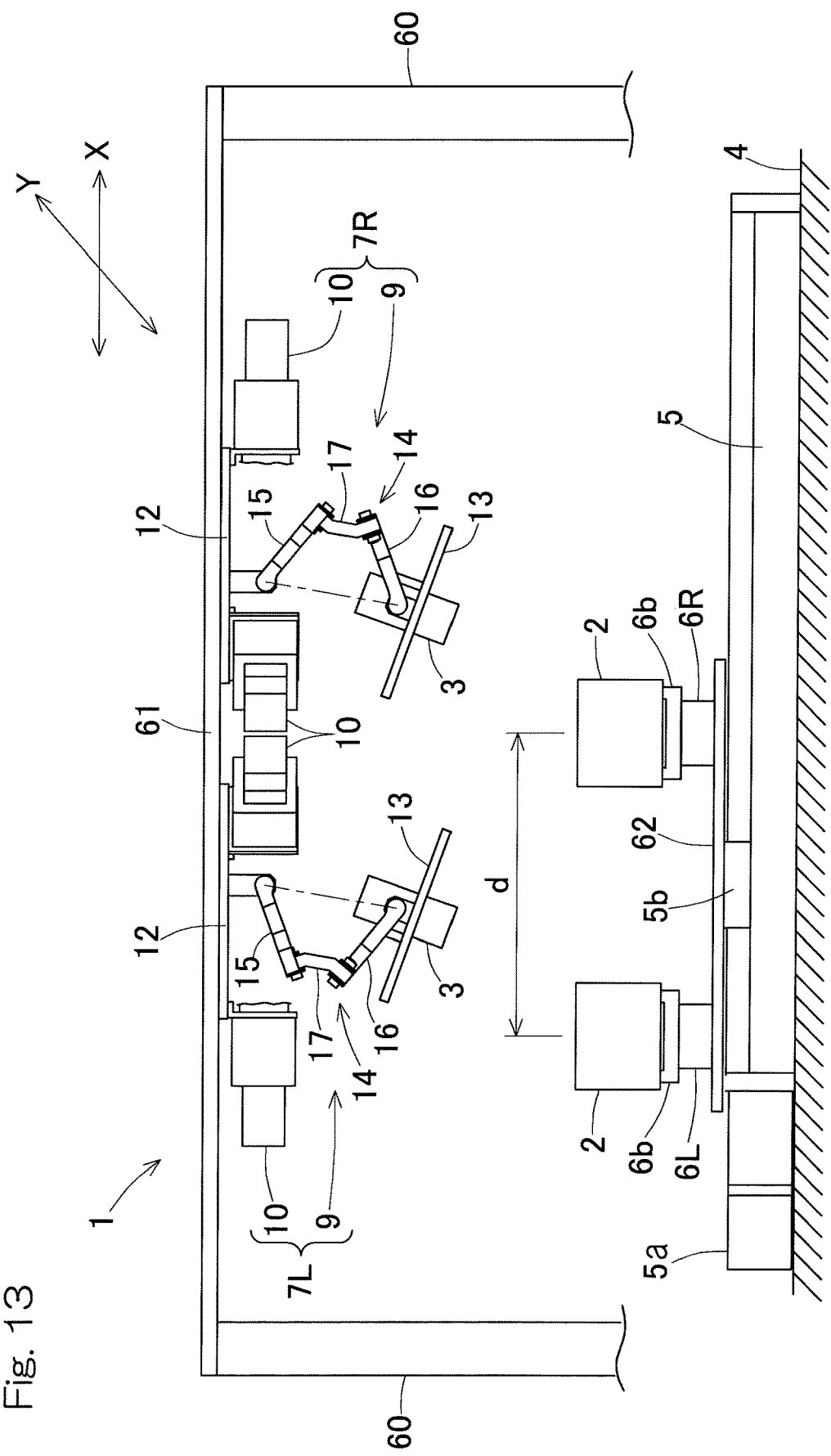
FIG. 13 is a front view of a state of a composite work apparatus according to a third embodiment of the present invention.

The composite work apparatus 1 according to a third embodiment shown in FIG. 13 is configured such that the positions of the link actuation devices 7L and 7R are fixed and the two work objects 2, 2 are moved. That is, the link actuation devices 7L and 7R are mounted in a suspended posture such that the proximal end side link hubs 12 are fixed to the top plate 61. In addition, the mounting plate 62 is fixed to the stage 5b of the first linear motion actuator 5 mounted on the floor 4, the second and third linear motion actuators 6L and 6R are mounted on the mounting plate 62, and the work objects 2, 2 are placed on the stages 6b, 6b of the second and third linear motion actuators 6L and 6R, respectively.

In the case with the third embodiment, the two work objects 2, 2 are moved by the first linear motion actuator 5 in the right-left direction (X-axis direction) and are moved by the second and third linear motion actuators 6L and 6R in the front-rear direction (Y-axis direction). By so doing, work is performed on the work objects 2, 2 with the working bodies 3, 3 supported by the link actuation devices 7L and 7R. Accordingly, the same operations and effects as those in the first embodiment in FIG. 1 to FIG. 3 are achieved.

Figure 14:
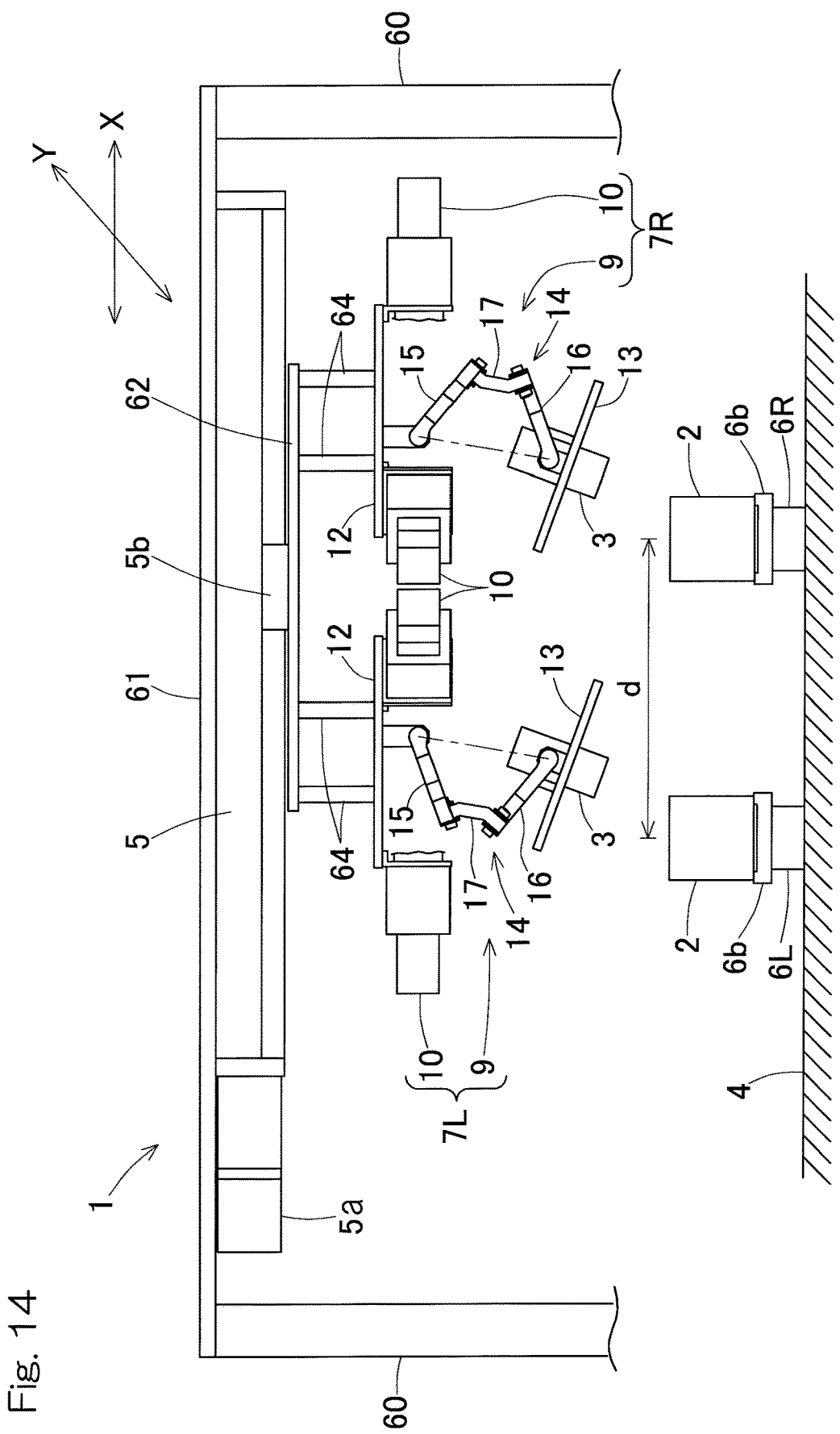
FIG. 14 is a front view of a state of a composite work apparatus according to a fourth embodiment of the present invention.

In the composite work apparatus 1 according to a fourth embodiment shown in FIG. 14, the link actuation devices 7L and 7R are moved in the right-left direction (X-axis direction) by the first linear motion actuator 5 and the two work objects 2, 2 are moved in the front-rear direction (Y-axis direction) by the second and third linear motion actuators 6L and 6R, respectively. That is, the first linear motion actuator 5 is mounted on the top plate 61, the mounting plate 62 is fixed to the stage 5b of the first linear motion actuator 5, and the link actuation devices 7L and 7R are mounted on the mounting plate 62. In addition, the second and third linear motion actuators 6L and 6R are mounted on the floor 4, and the work objects 2, 2 are placed on the stages 6b, 6b of the second and third linear motion actuators 6L and 6R, respectively. In the case with the fourth embodiment as well, the same operations and effects as those in the first embodiment in FIG. 1 to FIG. 3 are achieved.

Although not shown, the link actuation devices 7L and 7R may be moved in the front-rear direction (Y-axis direction) by the second and third linear motion actuators 6L and 6R mounted on the top plate 61, respectively, and the two work objects 2, 2 may be moved in the right-left direction (X-axis direction) by the first linear motion actuator 5 mounted on the floor 4. In this case as well, the same operations and effects as those in the first embodiment in FIG. 1 to FIG. 3 are achieved.

Figure 15:
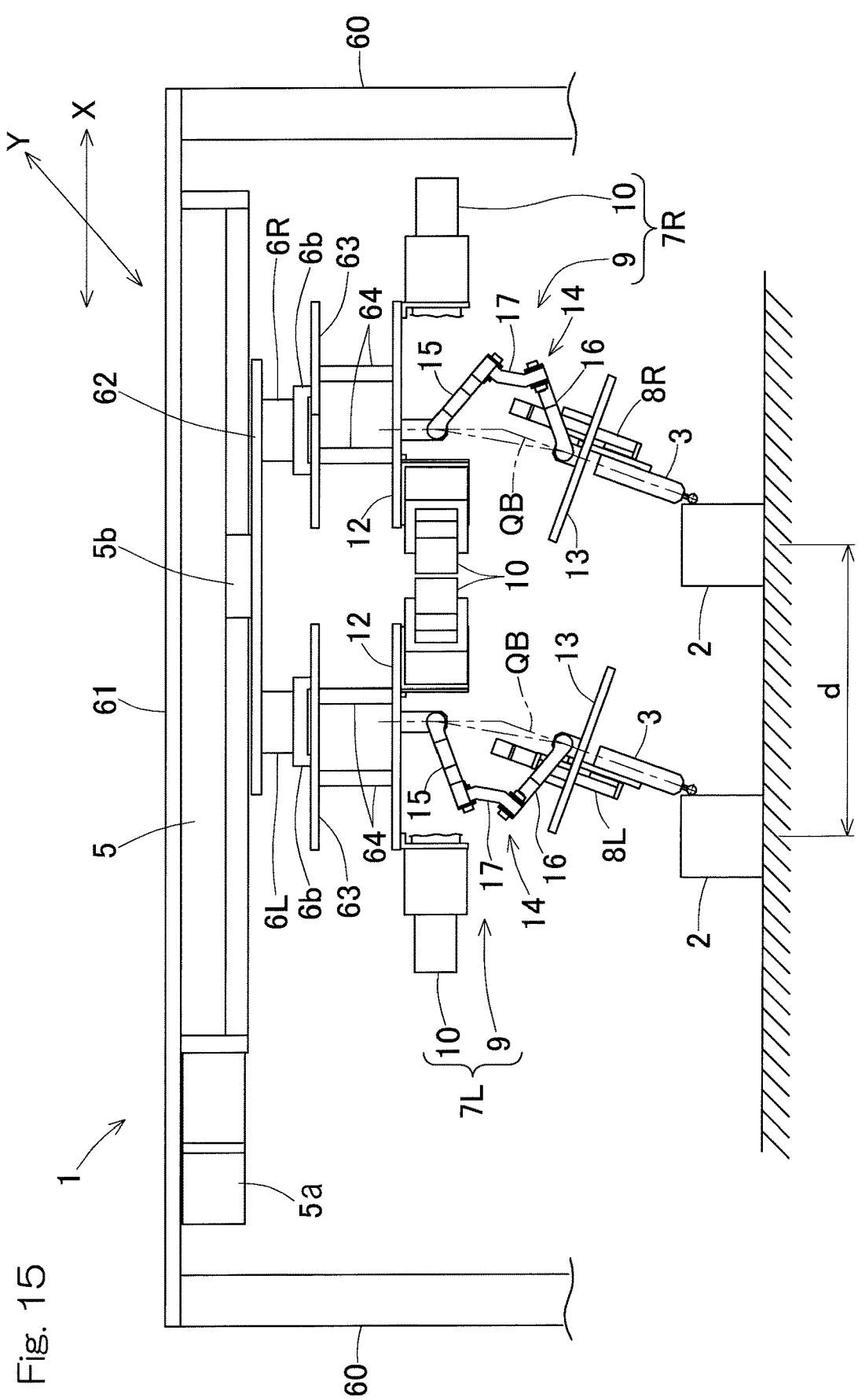
FIG. 15 is a front view of a state of a composite work apparatus according to a fifth embodiment of the present invention.

The composite work apparatus 1 according to a fifth embodiment shown in FIG. 15 is obtained by adding fourth and fifth linear motion actuators 8L and 8R that move the working bodies 3, 3 in a single axis direction, to the two link actuation devices 7L and 7R, respectively, in the first embodiment in FIG. 1 to FIG. 3. Each of the fourth and fifth linear motion actuators 8L and 8R is fixed to the distal end side link hub 13, and moves the working body 3 in a direction parallel to the central axis QB of the distal end side link hub 13. As shown by the broken lines in FIG. 10, motors 8a, 8a of the fourth and fifth linear motion actuators 8L and 8R are also connected to the controller 71 via the communication network 70.

The addition of the fourth and fifth linear motion actuators 8L and 8R as described above allows work to be performed on the work objects 2, 2 in a contact manner with the working bodies 3, 3. Examples of the working bodies 3 that perform work on the work objects 2 in a contact manner include a component assembling machine and a processing machine. The fourth and fifth linear motion actuators 8L and 8R may also be added to each embodiment other than the first embodiment shown in FIG. 1 to FIG. 3. In this case as well, work is allowed to be performed on the work objects 2, 2 in a contact manner with the work machines 3, 3.

Linear motion actuators (not shown) for movement in the vertical direction or up-down direction may be added instead of the fourth and fifth linear motion actuators 8L and 8R that move the working bodies 3, 3 in a single axis direction, and the heights of the link actuation devices 7L and 7R or the work objects 2, 2 may be changed by the linear motion actuators for movement in the up-down direction. In this case as well, work is allowed to be performed on the work objects 2, 2 in a contact manner with the work machines 3, 3 in addition to work on the work objects 2, 2 in a non-contact manner.

In each embodiment described above, the two link actuation devices 7L and 7R have the same configuration and have the same operation pattern. However, the configurations and the operation patterns of the two link actuation devices 7L and 7R may be different from each other. In this case, regarding the configuration for moving the two link actuation devices 7L and 7R by the shared first linear motion actuator 5, an operation command may be provided to the first linear motion actuator 5 after completion of operation of the two link actuation devices 7L and 7R.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . composite work apparatus
2 . . . work object
3 . . . working body
4 . . . floor
5 . . . first linear motion actuator
5b . . . stage
6L . . . second linear motion actuator
6R . . . third linear motion actuator
7L, 7R . . . link actuation device
8L . . . fourth linear motion actuator
8R . . . fifth linear motion actuator
9 . . . parallel link mechanism
10 . . . posture control actuator
12 . . . proximal end side link hub
13 . . . distal end side link hub
14 . . . link mechanism
15 . . . proximal side end link member
16 . . . distal side end link member
17 . . . intermediate link member
61 . . . top plate
62 . . . mounting plate
70 . . . communication network
71 . . . controller
d . . . inter-work object distance

What is claimed is:

1. A composite work apparatus configured to perform work on two or more work objects with two working bodies in a contact state or in a non-contact state, the composite work apparatus comprising:

two link actuation devices supporting the two respective working bodies such that postures of the working bodies can be individually changed; and three or more linear motion actuators configured to move the two link actuation devices relative to the two or more work objects, wherein each of the link actuation devices includes: a proximal end side link hub; a distal end side link hub; and three or more link mechanisms which connect the proximal end side link hub to the distal end side link hub such that a posture of the distal end side link hub relative to the proximal end side link hub can be changed, each of the link mechanisms includes: a proximal side end link member coupled at one end thereof to the proximal end side link hub; a distal side end link member coupled at one end thereof to the distal end side link hub; and an intermediate link member rotatably coupled at both ends thereof to the other ends of the proximal side and distal side end link members, respectively, a posture control actuator, which arbitrarily changes the posture of the distal end side link hub relative to the proximal end side link hub, is provided at each of two or more link mechanisms of the three or more link mechanisms, a first linear motion actuator, that is one of the three or more linear motion actuators, directly or indirectly moves the two link actuation devices or the two or more work objects along a predetermined line with an interval therebetween kept constant, and a second linear motion actuator and a third linear motion actuator, that are two linear motion actuators, other than the first linear motion actuator, of the three or more linear motion actuators, directly or indirectly move the two link actuation devices or the two or more work objects in a direction perpendicular to a movement direction of the first linear motion actuator.

2. The composite work apparatus as claimed in claim 1, wherein at least one of the three or more linear motion actuators includes two stages that are aligned along a movement direction of the linear motion actuator, and a movement body is fixed to each of the stages, the movement body including any of the two link actuation devices, the two or more work objects and the other linear motion actuators of the three or more linear motion actuators.

3. The composite work apparatus as claimed in claim 1, wherein the three or more linear motion actuators are composed of three linear motion actuators including the first linear motion actuator, the second linear motion actuator and the third linear motion actuator, a mounting plate is mounted on a stage of the first linear motion actuator, the second linear motion actuator and the third linear motion actuator are mounted to the mounting plate, and the two link actuation devices are mounted on the second linear motion actuator and the third linear motion actuator, respectively.

4. The composite work apparatus as claimed in claim 3, further comprising a top plate horizontally provided above a floor, wherein the first linear motion actuator is fixed to the top plate, and each link actuation device is mounted such that the distal end side link hub is directed downward.

5. The composite work apparatus as claimed in claim 1, wherein the two link actuation devices are disposed such that one actuator of the posture control actuators provided to the two or more link mechanisms of one of the two link actuation devices and another one posture control actuator of the posture control actuators provided to the other two or more link mechanisms of the other of the two link actuation devices are parallel to each other on the same plane, and each of such one posture control actuators is disposed so as to face outward with respect to the three or more link mechanisms.

6. The composite work apparatus as claimed in claim 1, wherein the three or more linear motion actuators and the respective posture control actuators of the two link actuation devices are connected to each other via a communication network, and one controller configured to control the respective actuators is provided.

* * * * *